United States Patent
Tamse et al.

(10) Patent No.: US 12,160,575 B2
(45) Date of Patent: Dec. 3, 2024

(54) ENCODING METHOD AND DEVICE, AND DECODING METHOD AND DEVICE

(71) Applicant: SAMSUNG ELECTRONICS CO., LTD., Suwon-si (KR)

(72) Inventors: Anish Tamse, Seoul (KR); Yin-ji Piao, Yongin-si (KR); Jin-Young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 232 days.

(21) Appl. No.: 17/838,882

(22) Filed: Jun. 13, 2022

(65) Prior Publication Data
US 2022/0312011 A1    Sep. 29, 2022

Related U.S. Application Data

(63) Continuation of application No. 16/648,546, filed as application No. PCT/KR2018/011561 on Sep. 28, 2018, now Pat. No. 11,363,267.
(Continued)

(51) Int. Cl.
*H04N 19/00* (2014.01)
*H04N 19/119* (2014.01)
(Continued)

(52) U.S. Cl.
CPC ......... *H04N 19/119* (2014.11); *H04N 19/129* (2014.11); *H04N 19/139* (2014.11); *H04N 19/176* (2014.11)

(58) Field of Classification Search
CPC .. H04N 19/625; H04N 19/176; H04N 19/159; H04N 19/18; H04N 19/70;
(Continued)

(56) References Cited

U.S. PATENT DOCUMENTS 10,091,526 B2    10/2018    Kim et al.
10,560,712 B2    2/2020    Zou
(Continued)

FOREIGN PATENT DOCUMENTS

EP          3 522 532 A1    8/2019
KR    10-2014-0022009 A    2/2014
(Continued)

OTHER PUBLICATIONS

Communication issued Jan. 21, 2022 by the Korean Intellectual Property Office in counterpart Korean Patent Application No. 10-2021-7033065.
(Continued)

*Primary Examiner* — Frank F Huang
(74) *Attorney, Agent, or Firm* — Sughrue Mion, PLLC

(57) ABSTRACT

Provided is a video decoding method including: obtaining affine parameter group candidates of a current block based on whether adjacent blocks of the current block are decoded; determining an affine parameter group of the current block from among the affine parameter group candidates, according to affine parameter information of the current block; and reconstructing the current block, based on one or more affine parameters included in the affine parameter group.

3 Claims, 35 Drawing Sheets

Related U.S. Application Data

(60) Provisional application No. 62/564,697, filed on Sep. 28, 2017.

(51) Int. Cl.
*H04N 19/129* (2014.01)
*H04N 19/139* (2014.01)
*H04N 19/176* (2014.01)

(58) Field of Classification Search
CPC .. H04N 19/132; H04N 19/122; H04N 19/119; H04N 19/105; H04N 19/46; H04N 19/619; H04N 19/12; H04N 19/11; H04N 19/184; H04N 19/436; H04N 19/50; H04N 19/593
See application file for complete search history.

(56) References Cited

U.S. PATENT DOCUMENTS

| | | | |
|---|---|---|---|
| 10,623,767 B2 | 4/2020 | Nam | |
| 10,681,379 B2* | 6/2020 | Zhao | H04N 1/32181 |
| 10,728,571 B2 | 7/2020 | Son et al. | |
| 11,082,692 B2* | 8/2021 | Hollmann | H04N 19/12 |
| 2012/0008676 A1 | 1/2012 | Lee et al. | |
| 2013/0022127 A1 | 1/2013 | Park et al. | |
| 2013/0083853 A1* | 4/2013 | Coban | H04N 19/51 |
| | | | 375/E7.243 |
| 2014/0269923 A1 | 9/2014 | Kwon et al. | |
| 2017/0054996 A1 | 2/2017 | Xu et al. | |
| 2018/0192069 A1* | 7/2018 | Chen | H04N 19/176 |
| 2018/0220149 A1 | 8/2018 | Son et al. | |
| 2018/0295381 A1* | 10/2018 | Chen | H04N 19/52 |
| 2018/0376150 A1 | 12/2018 | Iwamura | |
| 2019/0116376 A1* | 4/2019 | Chen | H04N 19/70 |
| 2019/0387241 A1* | 12/2019 | Kim | H04N 19/46 |
| 2020/0007877 A1* | 1/2020 | Zhou | H04N 19/105 |
| 2020/0007889 A1* | 1/2020 | Chao | H04N 19/423 |
| 2020/0213608 A1* | 7/2020 | Chen | H04N 19/147 |
| 2020/0260106 A1* | 8/2020 | Huang | H04N 19/513 |
| 2020/0288121 A1* | 9/2020 | Zhao | H04N 19/12 |
| 2020/0366937 A1* | 11/2020 | Egilmez | H04N 19/12 |
| 2020/0404276 A1* | 12/2020 | Nalci | H04N 19/59 |
| 2021/0058642 A1* | 2/2021 | Egilmez | H04N 19/13 |
| 2021/0092381 A1* | 3/2021 | Egilmez | H04N 19/176 |
| 2021/0092408 A1* | 3/2021 | Ramasubramonian | |
| | | | H04N 19/159 |
| 2021/0099702 A1* | 4/2021 | Egilmez | H04N 19/70 |
| 2021/0160527 A1* | 5/2021 | Chuang | H04N 19/513 |
| 2021/0160541 A1* | 5/2021 | Chiang | H04N 19/176 |
| 2021/0203947 A1* | 7/2021 | He | H04N 19/159 |
| 2021/0211715 A1* | 7/2021 | Chen | H04N 19/52 |
| 2021/0211729 A1* | 7/2021 | Koo | H04N 19/119 |
| 2021/0235119 A1* | 7/2021 | Kim | H04N 19/11 |
| 2022/0053206 A1* | 2/2022 | Ko | H04N 19/54 |
| 2023/0136599 A1* | 5/2023 | He | H04N 19/54 |
| | | | 375/240.02 |

FOREIGN PATENT DOCUMENTS

| | | |
|---|---|---|
| KR | 10-2014-0113855 A | 9/2014 |
| KR | 10-1543309 B1 | 8/2015 |
| KR | 10-1653274 B1 | 9/2016 |
| KR | 10-2019-0006967 A | 1/2019 |
| WO | 2017/022973 A1 | 2/2017 |
| WO | 2017118411 A1 | 7/2017 |
| WO | 2017/157259 A1 | 9/2017 |

OTHER PUBLICATIONS

Bross, Benjamin et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K1001-V6, Sep. 21, 2018, pp. 1-131. (139 pages total).
Chen, Huanbang et al., "CE4: Affine merge enhancement (Test 2.10)", Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0186-v3, Jul. 10, 2018, pp. 1-6. (6 pages total).
Communication issued Mar. 17, 2022 by the Intellectual Property Office of India in counterpart Indian Patent Application No. 202027012546.
Communication dated Apr. 3, 2021, issued by the Korean Intellectual Property Office in Korean Application No. 10-2020-7004581.
Communication dated May 3, 2021, from the European Patent Office in European Application No. 18862517.2.
Huawei Technologies Co., Ltd., "Affine transform prediction for next generation video coding", International Telecommunication Union, Oct. 2015, pp. 1-11 (11 pages total).
Feng Zou et al., "Improved affine motion prediction", Joint Video Exploration Team (JVET), ITU-T SG 16 WP 3 and ISO/IEC JTC 1/SC 29/WG 11, May 26-Jun. 1, 2016, Geneva, CH, pp. 1-5 (5 pages total).
Jianle Chen et al., "Algorithm Description of Joint Exploration Test Model 7 (JEM7)", JVET-G1001-v1, Joint Video Exploration Team (JVET) of ITU-T SG 16 WP3 and ISO/IEC JTC 1/SC 29/WG 11, 7th Meeting, Torino, IT, Aug. 19, 2017, 50 pages.
Written Opinion (PCT/ISA/237) and International Search Report (PCT/ISA/210) dated Jan. 11, 2019, issued by the International Searching Authority in International Application PCT/KR2018/011561.
Yu Han et al., "CE4.1.3: Affine motion compensation prediction", JVET-K0337, Joint Video Exploration Team (JVET) of ITU-T SG 16 WP 3 and ISO/IEC JTC 1/SC 29/WG 11, 11th Meeting, Ljubljana, SI, Jul. 10-18, 2018, 6 pages.
Communication dated Dec. 6, 2023, issued by the Brazilian Intellectual Property Office in Brazilian Patent Application No. BR112020005097-0.
Communication dated Dec. 7, 2023, issued by the Brazilian Intellectual Property Office in Brazilian Patent Application No. BR122022006669-0.
Communication dated Dec. 8, 2023, issued by the Brazilian Intellectual Property Office in Brazilian Patent Application No. BR122022006672-0.
Communication dated Dec. 8, 2023, issued by the Brazilian Intellectual Property Office in Brazilian Patent Application No. BR122022006677-1.
Communication dated Dec. 8, 2023, issued by the Brazilian Intellectual Property Office in Brazilian Patent Application No. BR122022006679-8.
Communication dated Dec. 21, 2023, issued by the European Patent Office in counterpart European Application No. 18862517.2.
Akula et al., "Description of SDR, HDR and 360° video coding technology proposal considering mobile application scenario by Samsung, Huawei, GoPro, and HiSilicon," buJoint Video Exploration Team (JVET) of ITU-T SG 16 WP 3 and ISO/1EC JTC 1/SC 29/WG 11, Document: JVET-J0024, Apr. 2018, Total 119 pages.
Piao et al., "CE1-related : Split Unit Coding Order," Joint Video Experts Team (JVET) of ITU-T SG 16 WP 3 and ISO/IEC JTC 1/SC 29/WG 11, Document: JVET-L0063-v1, Oct. 2018, Total 5 pages.
Communication dated Jul. 25, 2023 issued by the Brazil Patent Office in counterpart Brazil Application No. 112020005097-0.
Communication dated Jul. 27, 2023 issued by the Brazil Patent Office in counterpart Brazil Application No. 122022006669-0.
Communication dated Jul. 28, 2023 issued by the Brazil Patent Office in counterpart Brazil Application No. 122022006672-0.
Communication dated Jul. 28, 2023 issued by the Brazil Patent Office in counterpart Brazil Application No. 122022006677-1.
Communication dated Jul. 28, 2023 issued by the Brazil Patent Office in counterpart Brazil Application No. 122022006679-8.
Communication dated Jan. 5, 2023 issued by the State Intellectual Property Office of the P.R. China in application No. 201880063174.9.

(56) References Cited

OTHER PUBLICATIONS

Communication dated Oct. 6, 2022, issued by the Korean Intellectual Property Office in Korean Patent Application No. 10-2021-7033065.
Communication issued on Feb. 29, 2024 by the National Office of Intellectual Property of Vietnam (NOIP) for Vietnamese Patent Application No. 1-2020-02415.
Communication issued on Mar. 21, 2024 by the Brazil National Institute of Industrial Property (INPI) for Brazilian Patent Application No. BR112020005097-0.
Communication issued on Mar. 22, 2024 by the Brazil National Institute of Industrial Property (INPI) for Brazilian Patent Application No. BR122022006669-0.
Communication issued on Mar. 25, 2024 by the Brazil National Institute of Industrial Property (INPI) for Brazilian Patent Application No. BR122022006672-0.
Communication issued on Mar. 25, 2024 by the Brazil National Institute of Industrial Property (INPI) for Brazilian Patent Application No. BR122022006677-1.
Communication issued on Apr. 1, 2024 by the Brazil National Institute of Industrial Property (INPI) for Brazilian Patent Application No. BR122022006679-8.

* cited by examiner

FIG. 4
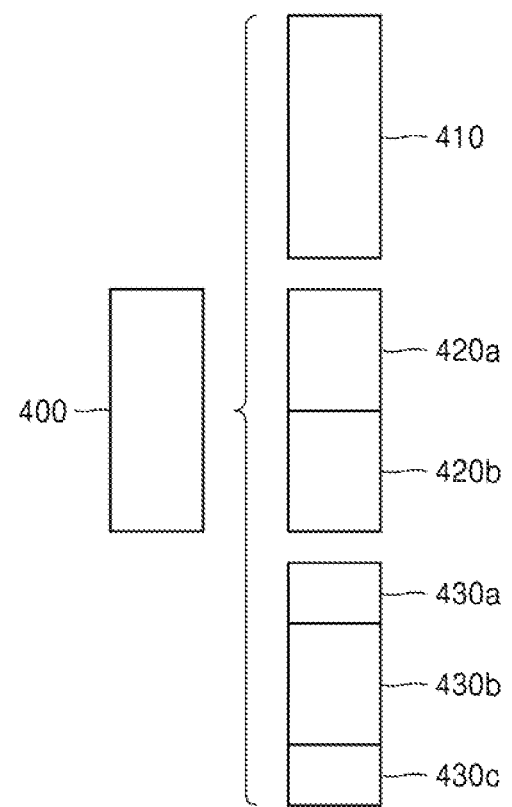
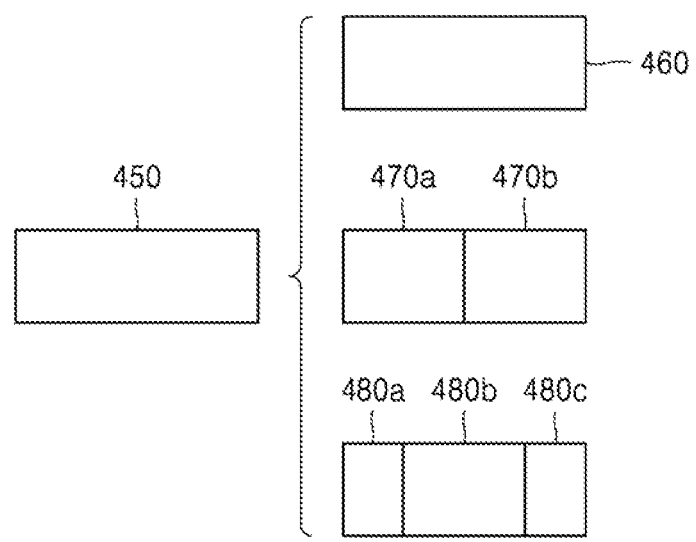

FIG. 13

| BLOCK TYPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

ENCODING METHOD AND DEVICE, AND DECODING METHOD AND DEVICE

CROSS-REFERENCE TO RELATED APPLICATIONS

This application is a continuation of U.S. patent application Ser. No. 16/648,546, filed on Mar. 18, 2020, now U.S. Pat. No. 11,363,267, which is a National Stage Application of International Application No. PCT/KR2018/011561, filed on Sep. 28, 2018, and which claims benefit of priority to U.S. Patent Application No. 62/564,697, filed on Sep. 28, 2017, the disclosures of which are incorporated herein in their entireties by reference.

TECHNICAL FIELD

The present disclosure relates to a video encoding method and decoding method, and more particularly, to an inter prediction method for image encoding/decoding methods and apparatuses.

BACKGROUND ART

A high quality video requires a large amount of data during encoding. However, a bandwidth allowed for transmitting video data is limited, and thus a data rate applied during video data transmission may be limited. Accordingly, for efficient transmission of the video data, there is a need for an encoding and decoding method of the video data, which minimizes deterioration of image quality while increasing a compression ratio.

The video data may be compressed by removing spatial redundancy and temporal redundancy between pixels. Because it is general for adjacent pixels to have a common feature, encoding information is transmitted in data units of pixels to remove redundancy between the adjacent pixels.

Pixel values of the pixels included in the data units are not directly transmitted, but a method required to obtain the pixel values is transmitted. A prediction method of predicting a pixel value similar to an original value is determined for each data unit and encoding information about the prediction method is transmitted from an encoder to a decoder. Also, because a prediction value is not completely the same as the original value, residual data regarding a difference between the original value and the prediction value is transmitted from the encoder to the decoder.

As prediction becomes more accurate, the encoding information required to specify the prediction method increases, but the size of residual data decreases. Accordingly, the prediction method is determined in consideration of the encoding information and the size of the residual data. In particular, a data unit split from a picture has various sizes, and when the size of the data increases, the accuracy of prediction is highly likely to decrease, but the encoding information decreases. Thus, the size of a block is determined according to a feature of the picture.

Also, the prediction method includes intra prediction and inter prediction. The intra prediction is a method of predicting pixels of a block based on neighboring pixels. The inter prediction is a method of predicting pixels by referring to a pixel of another picture to which a picture including a block refers. Accordingly, spatial redundancy is removed via the intra prediction and temporal redundancy is removed via the inter prediction.

When the number of prediction methods increases, the amount of encoding information for indicating the prediction methods increases. Accordingly, the size of encoding information may be reduced by also predicting the encoding information applied to the block from another block.

Because the loss of video data is allowed to an extent that is not recognized by human vision, the amount of residual data may be reduced via lossy compression of the residual data according to transformation and quantization processes.

DESCRIPTION OF EMBODIMENTS

Technical Problem

Provided is a video encoding method of determining motion vector resolution of a current block according to an encoding order of the current block, and whether an adjacent block is decoded. Also, provided is a video decoding method of determining motion vector resolution of a current block according to an encoding order of the current block, whether an adjacent block is decoded, and the like. In addition, provided is a computer-readable recording medium having recorded thereon a program for executing, on a computer, a video encoding method and a video decoding method, according to an embodiment of the present disclosure.

Solution to Problem

Provided is a video decoding method including: obtaining affine parameter group candidates of a current block based on whether adjacent blocks of the current block are decoded; determining an affine parameter group of the current block from among the affine parameter group candidates, according to affine parameter information of the current block; and reconstructing the current block, based on one or more affine parameters included in the affine parameter group.

Provided is a video decoding apparatus including a processor configured to obtain affine parameter group candidates of a current block based on whether adjacent blocks of the current block are decoded, determine an affine parameter group of the current block from among the affine parameter group candidates, according to affine parameter information of the current block, and reconstruct the current block, based on one or more affine parameters included in the affine parameter group.

Provided is a video encoding method including: determining affine parameter group candidates of a current block based on whether adjacent blocks of the current block are decoded; determining an optimum affine parameter group for predicting the current block; and determining affine parameter information of the current block indicating the optimum affine parameter group of the current block.

Provided is a video encoding apparatus including a processor configured to determine affine parameter group candidates of a current block based on whether adjacent blocks of the current block are decoded, determine an optimum affine parameter group for predicting the current block, and determine affine parameter information of the current block indicating the optimum affine parameter group of the current block.

Provided is a non-transitory computer-readable recording medium having recorded thereon a program for performing the video encoding method and the video decoding method.

The technical problems to be achieved by the disclosure are not limited to the technical features described above, and other technical problems may be inferred from embodiments below.

Advantageous Effects of Disclosure

Encoding efficiency of an affine mode can be improved by determining an affine parameter group in consideration of whether adjacent blocks of a current block are decoded.

BRIEF DESCRIPTION OF THE DRAWINGS

FIG. 4 illustrates a process, performed by an image decoding apparatus, of determining at least one coding unit by splitting a non-square coding unit, according to an embodiment.

FIG. 13 illustrates a process of determining a depth of a coding unit when a shape and size of the coding unit change, when the coding unit is recursively split such that a plurality of coding units are determined, according to an embodiment.

BEST MODE

Figure 1:
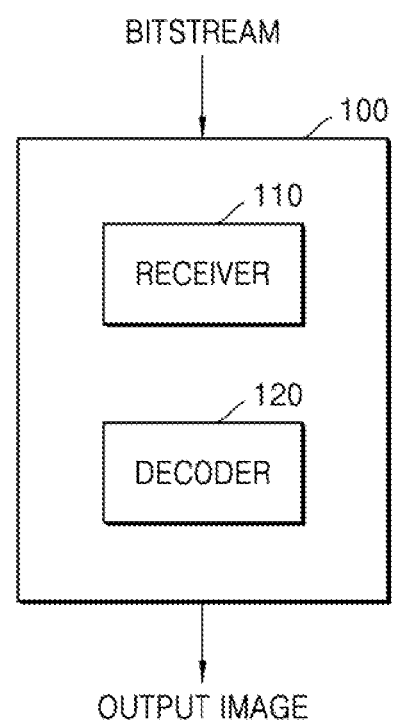
FIG. 1 is a schematic block diagram of an image decoding apparatus according to an embodiment.

Provided is a video decoding method including: obtaining affine parameter group candidates of a current block based on whether adjacent blocks of the current block are decoded; determining an affine parameter group of the current block from among the affine parameter group candidates, according to affine parameter information of the current block; and reconstructing the current block, based on one or more affine parameters included in the affine parameter group.

MODE OF DISCLOSURE

Advantages and features of one or more embodiments and methods of accomplishing the same may be understood more readily by reference to the embodiments and the accompanying drawings. In this regard, the embodiments of the disclosure may have different forms and should not be construed as being limited to the descriptions set forth herein. Rather, these embodiments are provided so that this disclosure will be thorough and complete and will fully convey the concept of the present embodiments of the disclosure to one of ordinary skill in the art.

The terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

Hereinafter, embodiments will be described in detail with reference to the accompanying drawings such that one of ordinary skill in the art may easily implement the embodiments. In the drawings, parts irrelevant to the description are omitted to clearly describe the present disclosure.

Hereinafter, an image encoding apparatus and an image decoding apparatus, and an image encoding method and an image decoding method according to embodiments will be described with reference to FIGS. 1 through 16. A method of determining a data unit of an image, according to an embodiment, is described with reference to FIGS. 3 through 16.

Hereinafter, a method and apparatus for adaptively selecting a context model, based on various shapes of coding units, according to an embodiment of the disclosure, will be described with reference to FIGS. 1 and 2.

FIG. 1 is a schematic block diagram of an image decoding apparatus 100 according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2800 described later. Also, the bitstream may be transmitted from the image encoding apparatus 2800. The image encoding apparatus 2800 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
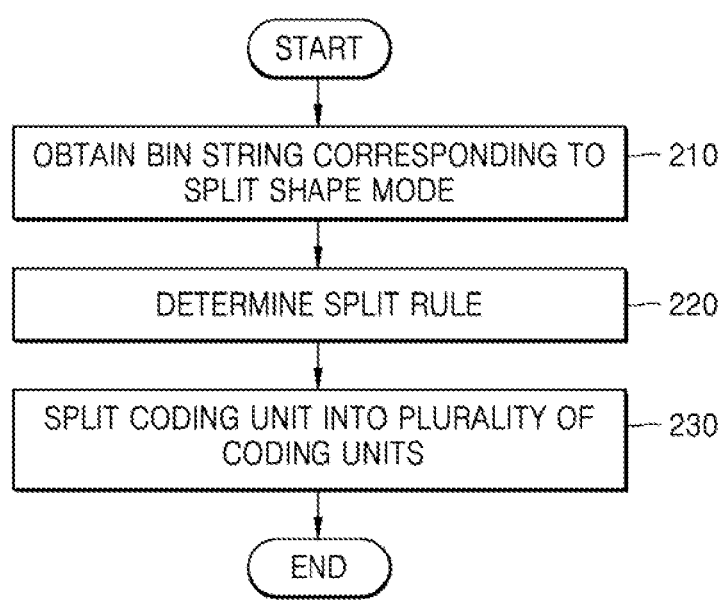
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices. One slice may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

A current block and a peripheral block of the disclosure may indicate one of the largest coding unit, the coding unit, the prediction block, and the transform block. Also, the current block of the current coding unit is a block that is currently being decoded or encoded or a block that is currently being split. The peripheral block may be a block reconstructed before the current block. The peripheral block may be adjacent to the current block spatially or temporally. The peripheral block may be located at one of the lower left, left, upper left, top, upper right, right, lower right of the current block.

Figure 3:
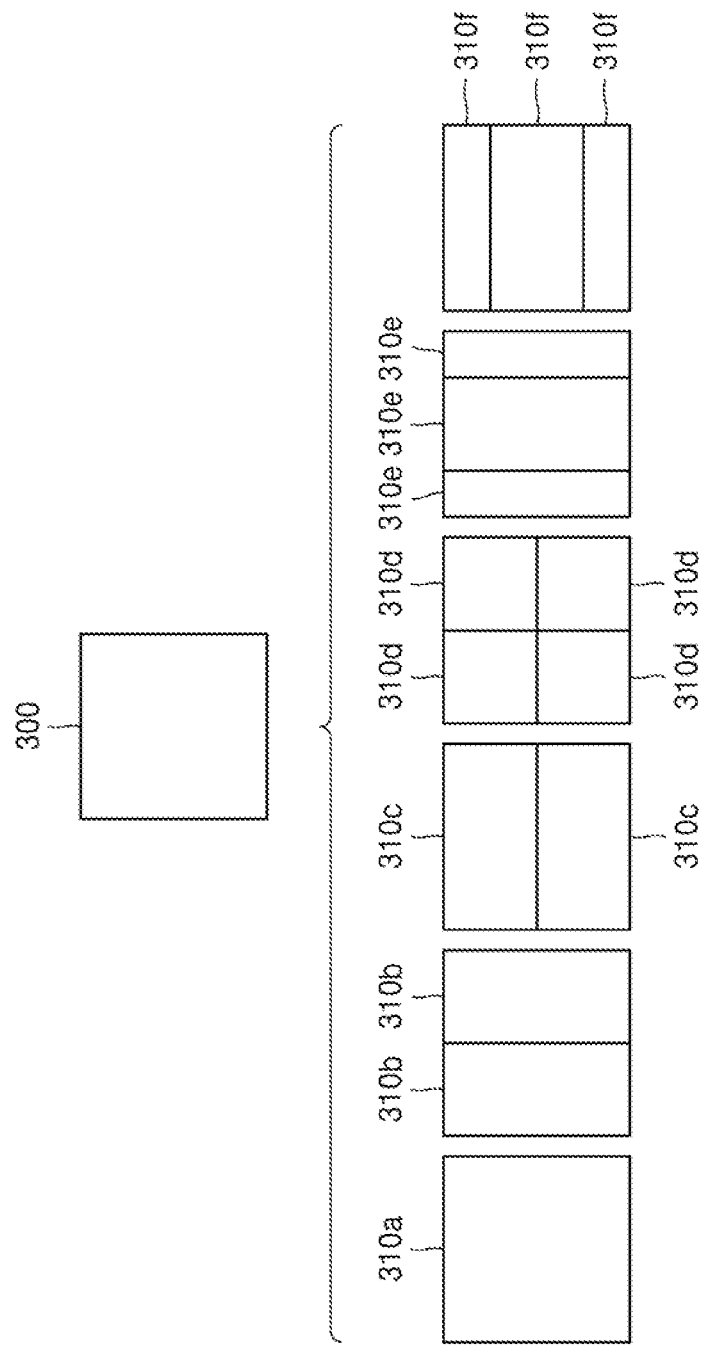
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2800 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a or 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a to 430c by splitting the current coding unit 400 in the horizontal direction. Also, when the current coding unit 450 is in the horizontal direction, the image decoding apparatus 100 may determine the coding units 480a to 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c* or 480*a*, 480*b*, and 480*c* generated as the current coding unit 400 or 450 is split to be different from that of the other coding units 430*a* and 430*c*, or 480*a* or 480*c*. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 5:
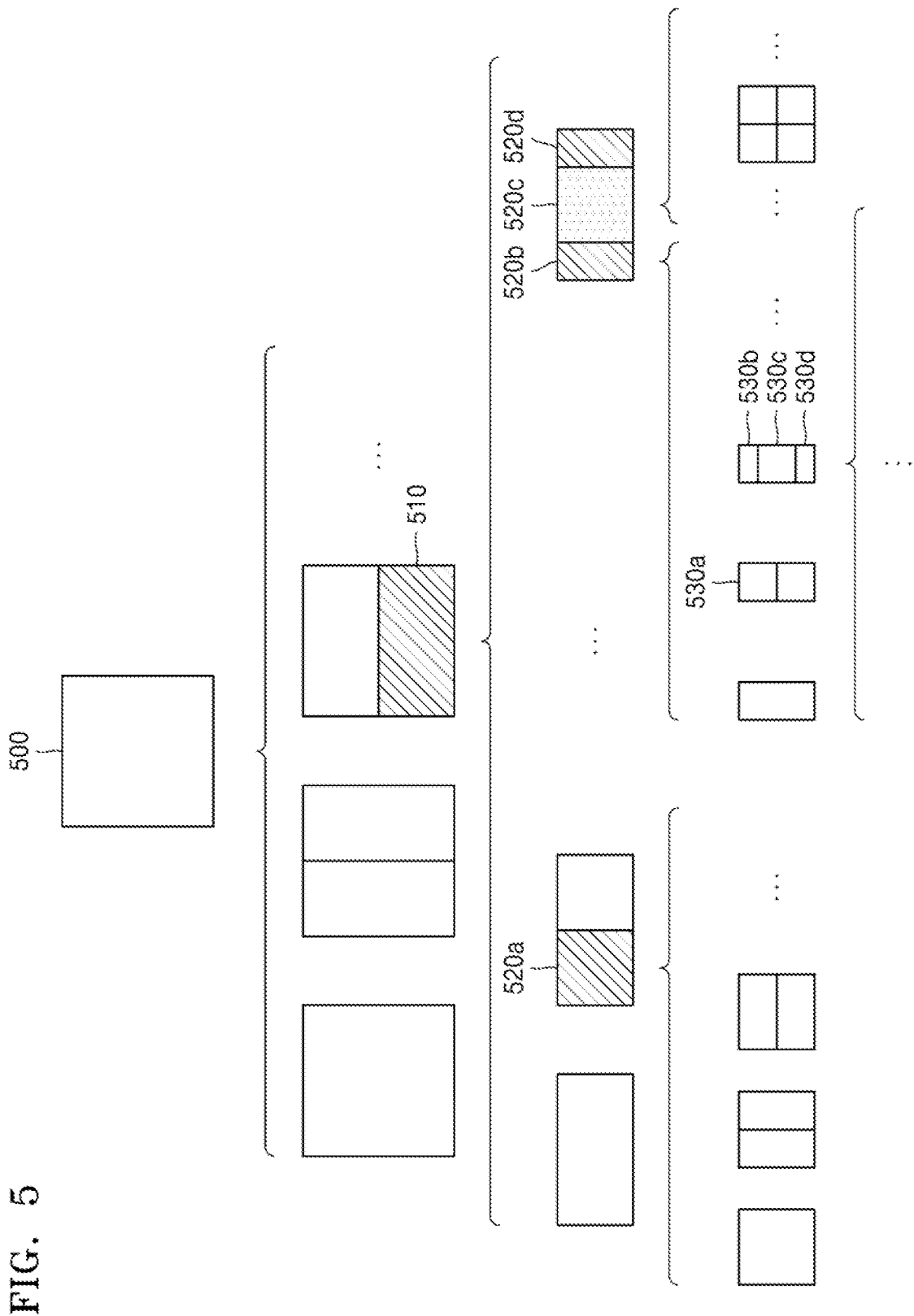
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, or 520*b*, 520*c*, and 520*d* based on the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit from among the odd number of third coding units 520*b*, 520*c*, and 520*d* determined by splitting the non-square second coding unit 510 (e.g., a coding unit or a square coding unit, which is located at a center location) may be recursively split.

According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a predetermined location in the current coding unit.

Figure 6:
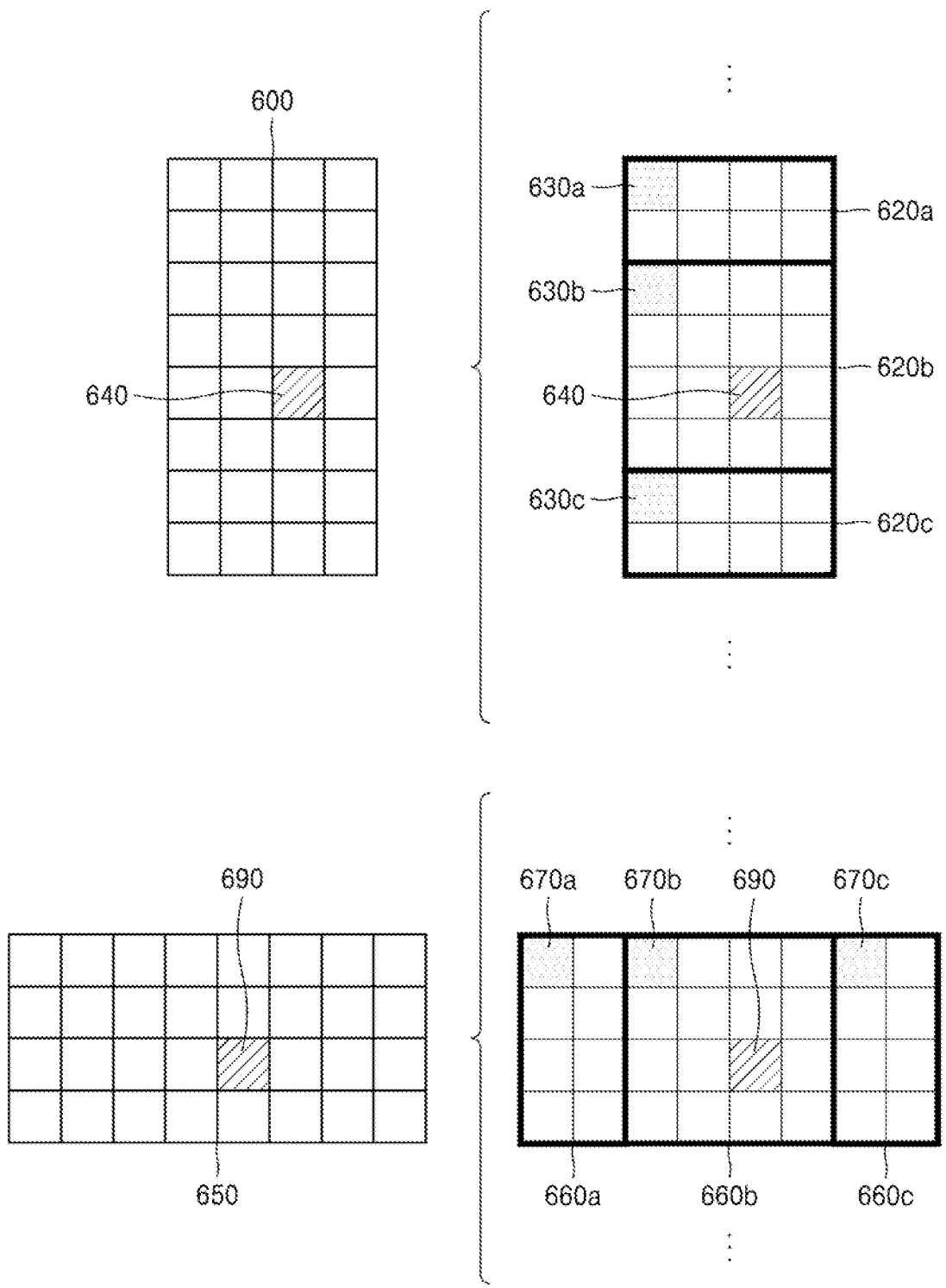
FIG. 6 illustrates a method, performed by an image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that is information indicating the location of a upper left sample 670*a* of the left coding unit 660*a*, the coordinates (xe, ye) that is information indicating the location of a upper left sample 670*b* of the middle coding unit 660*b*, and the coordinates (xf, yf) that is information indicating a location of the upper left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe−xd. The image decoding apparatus 100 may determine the height of the left coding unit 660*a* to be the height of the current coding unit 650. According to an embodiment, the image decoding apparatus 100 may determine the width of the middle coding unit 660*b* to be xf−xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a* to 660*c*. Referring to FIG. 6, the image decoding apparatus 100 may determine the middle coding unit 660*b*, which has a size different from the sizes of the left and right coding units 660*a* and 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary-splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620*b* including a sample, from which predetermined information (e.g., the split shape mode information) may be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information may be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
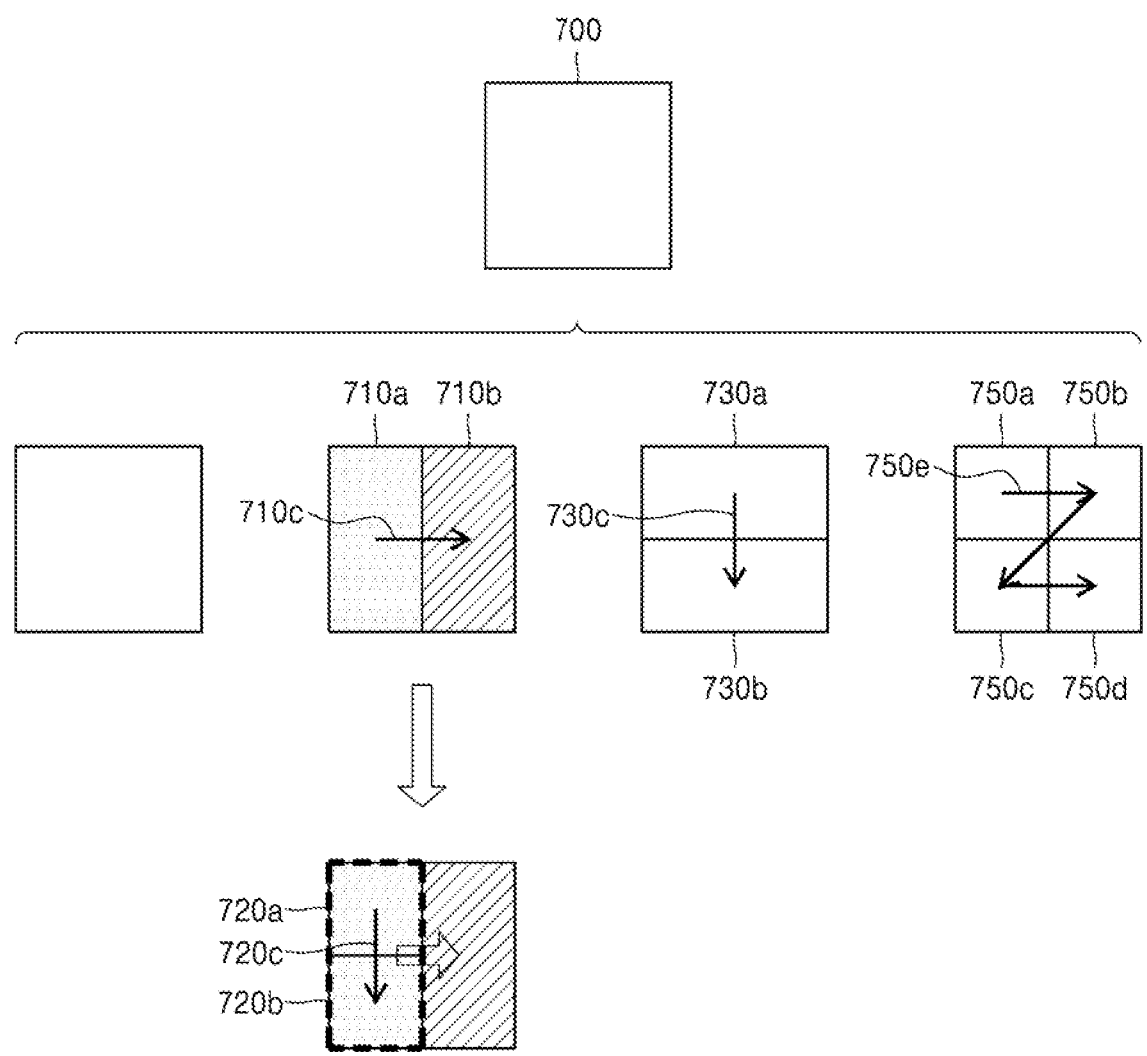
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710*a* and 710*b* by splitting a first coding unit 700 in a vertical direction, determine second coding units 730*a* and 730*b* by splitting the first coding unit 700 in a horizontal direction, or determine second coding units 750*a* to 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine to process the second coding units 750*a* to 750*d*, which are determined by splitting the first coding unit 700 in vertical and horizontal directions, according to a predetermined order (e.g., a raster scan order or Z-scan order 750*e*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a* to 750*d* by splitting the first coding unit 700, and recursively split each of the determined plurality of coding units 710*b*, 730*a* and 730*b*, or 750*a* to 750*d*. A splitting method of the plurality of coding units 710*b*, 730*a* and 730*b*, or 750*a* to 750*d* may correspond to a splitting method of the first coding unit 700. As such, each of the plurality of coding units 710*b*, 730*a* and 730*b*, or 750*a* to 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a predetermined order.

Figure 8:
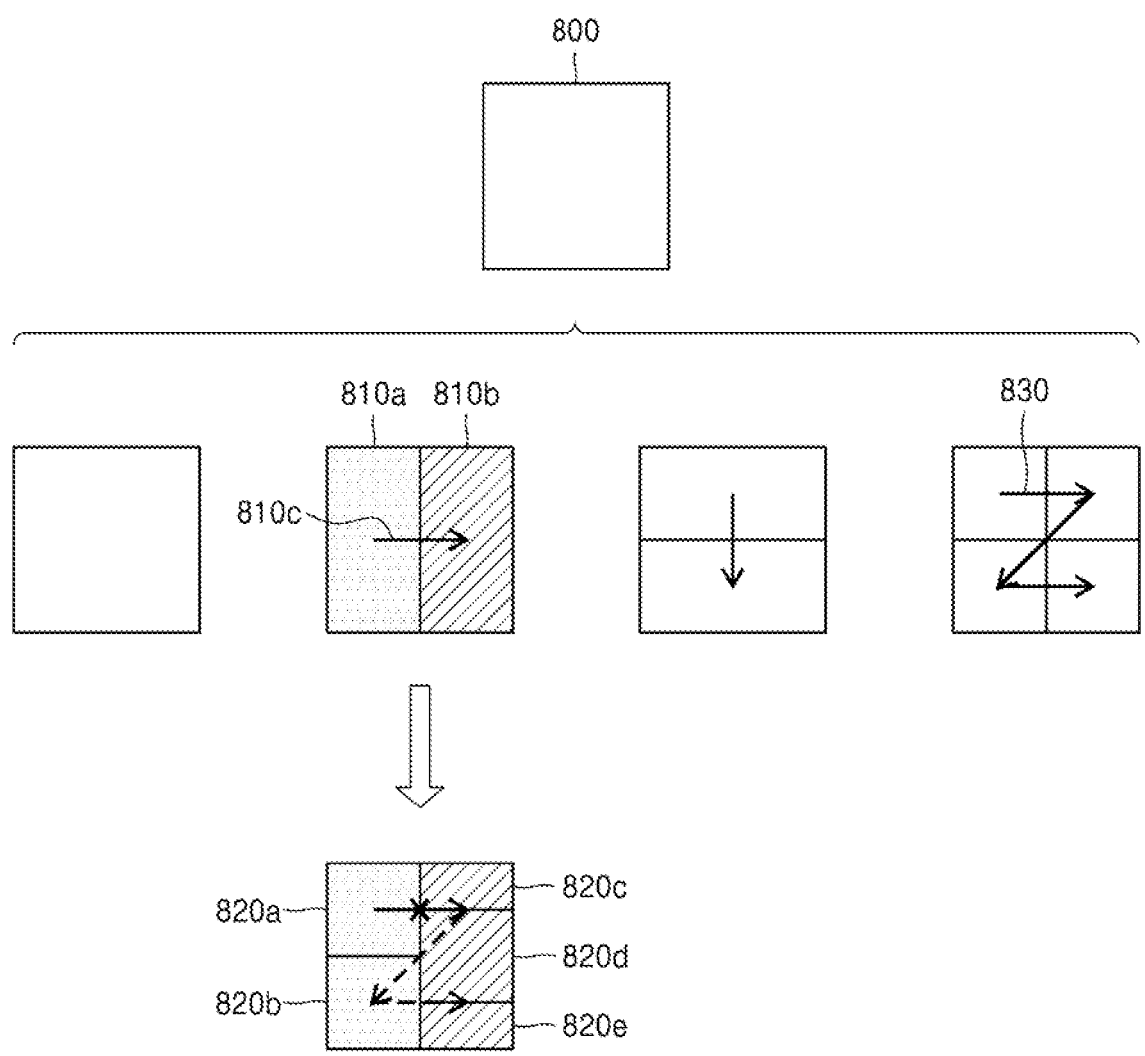
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c to 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
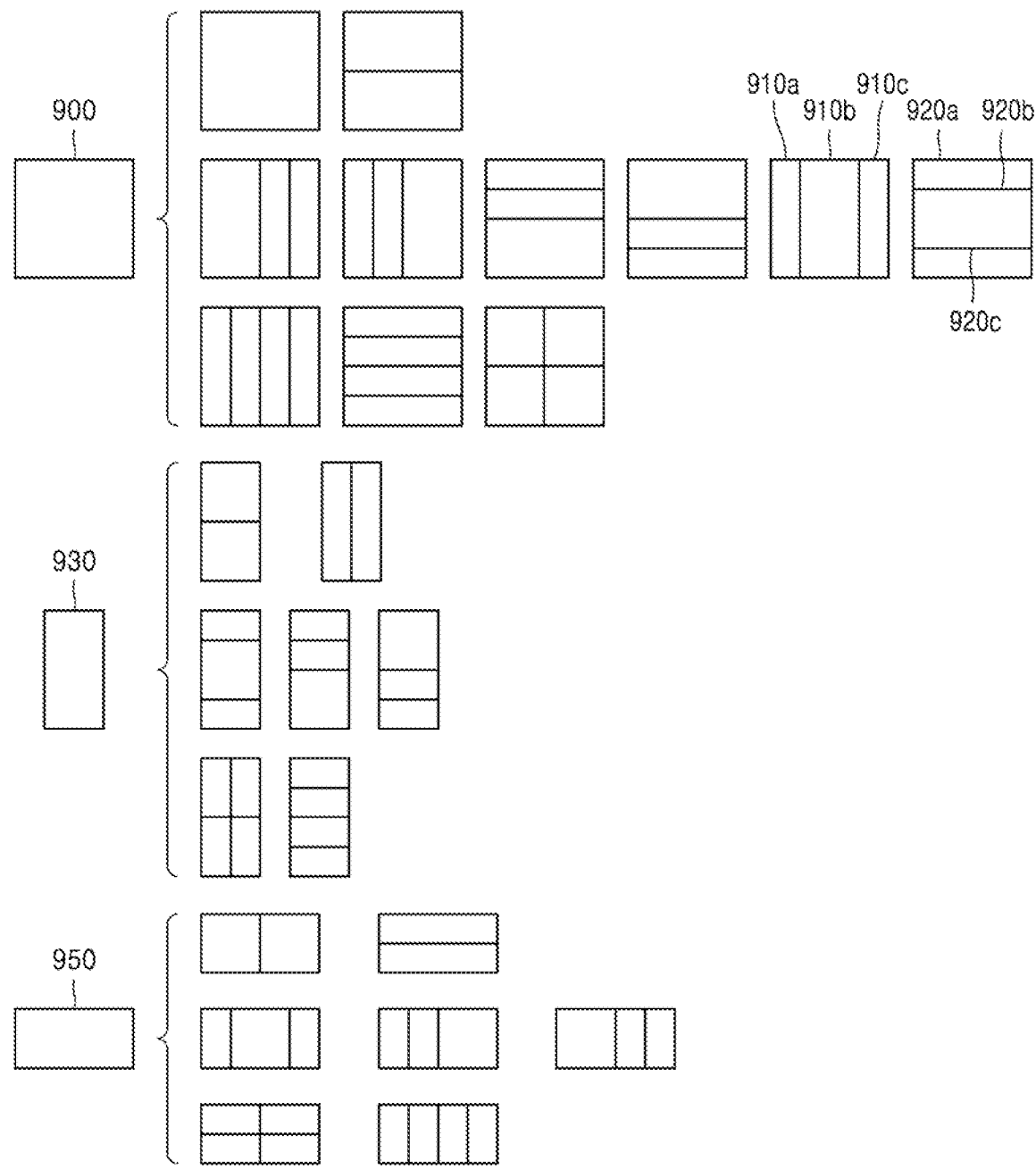
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
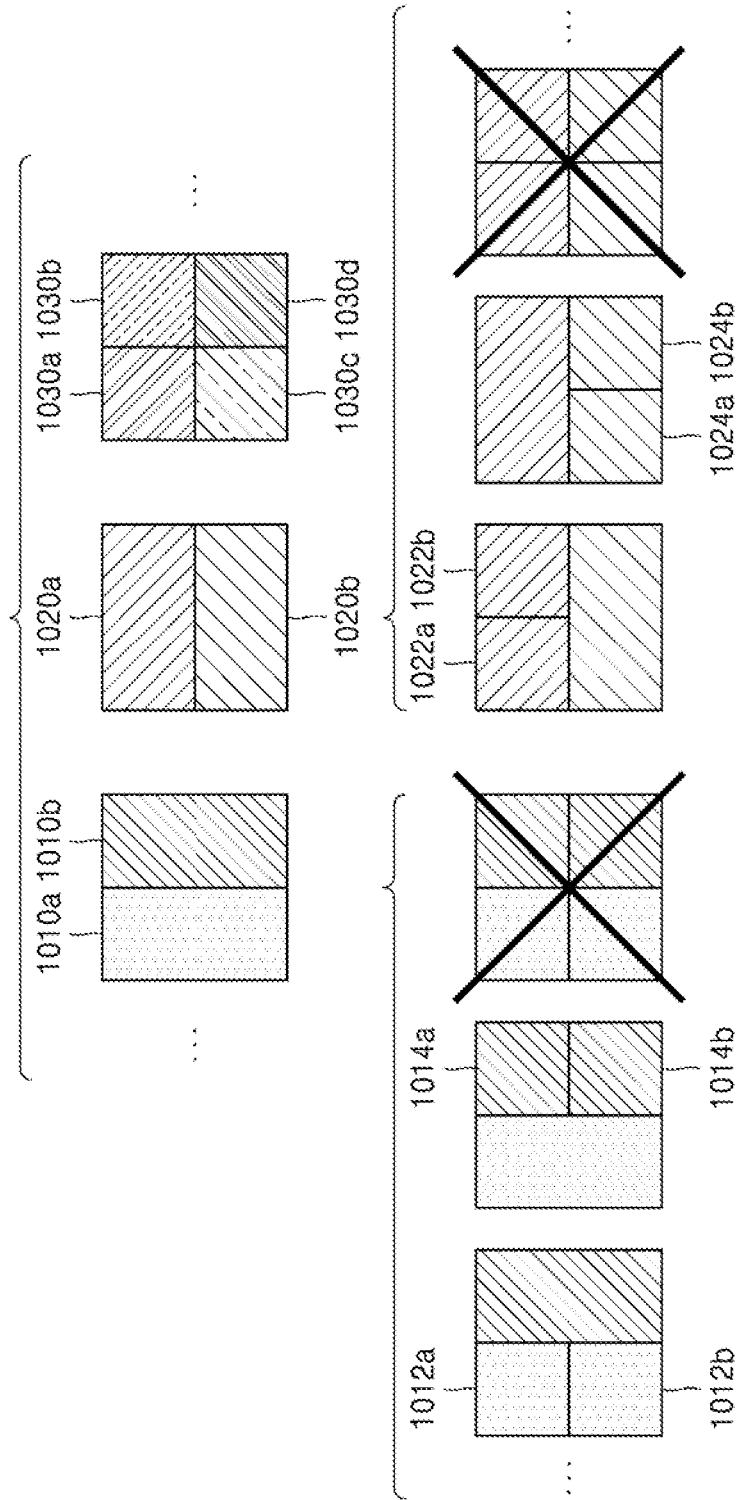
FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
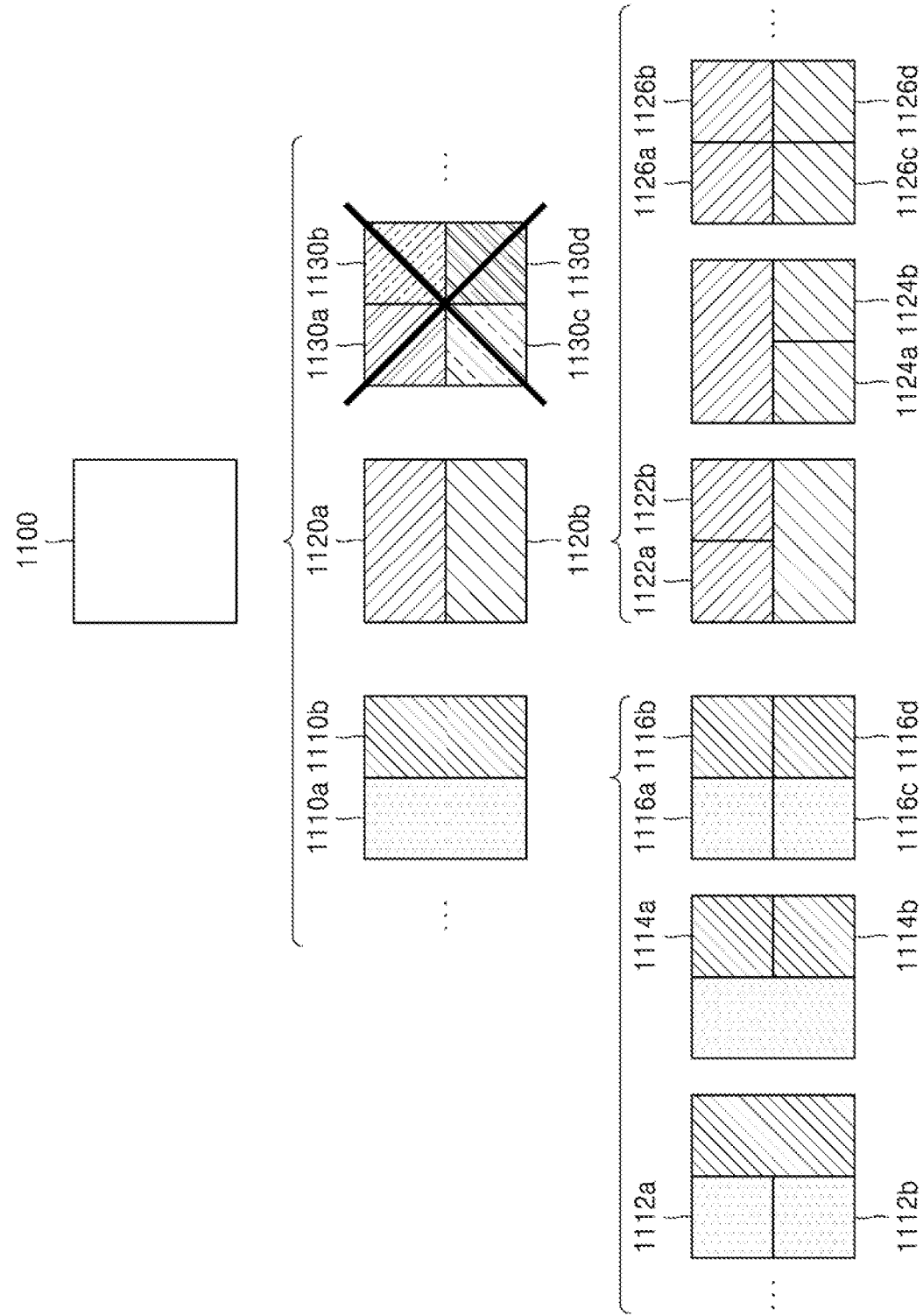
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by the image decoding apparatus 100, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
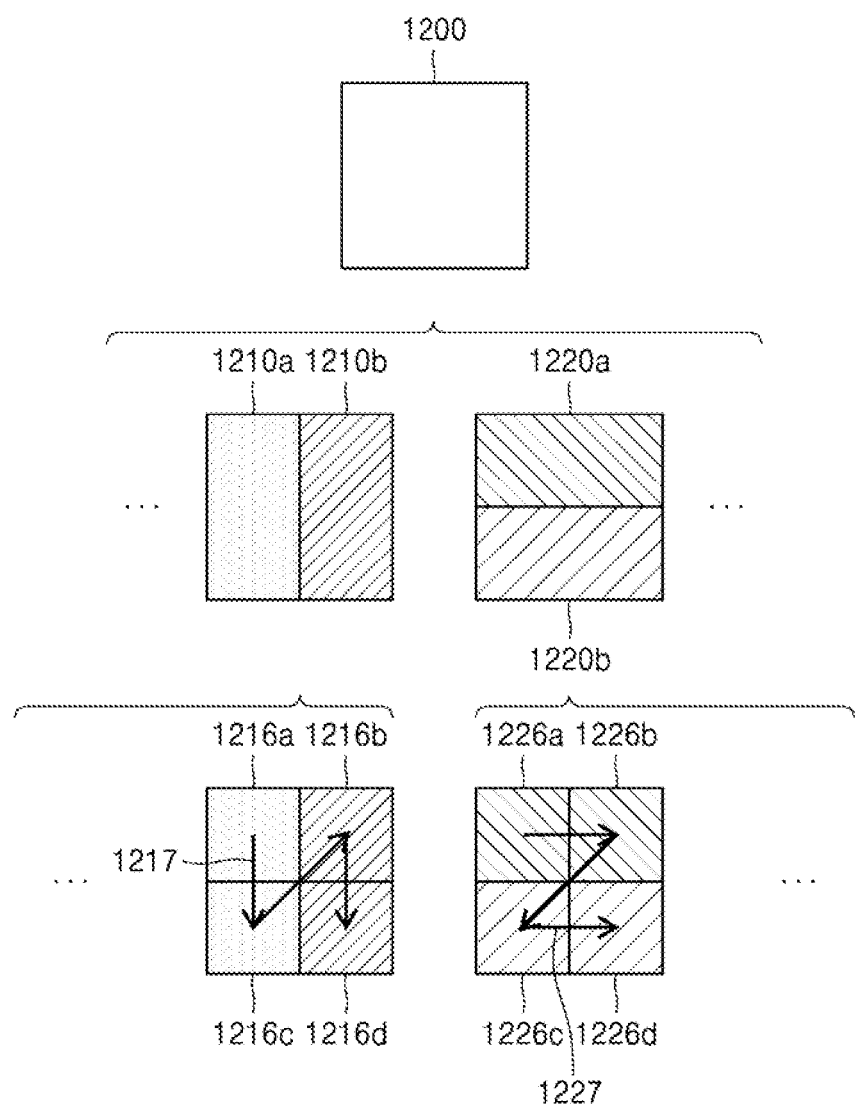
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1920b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 to ½ may have a size of N×N. Furthermore, the third coding unit 1304 determined by splitting a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of 2N×N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of 2N×N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
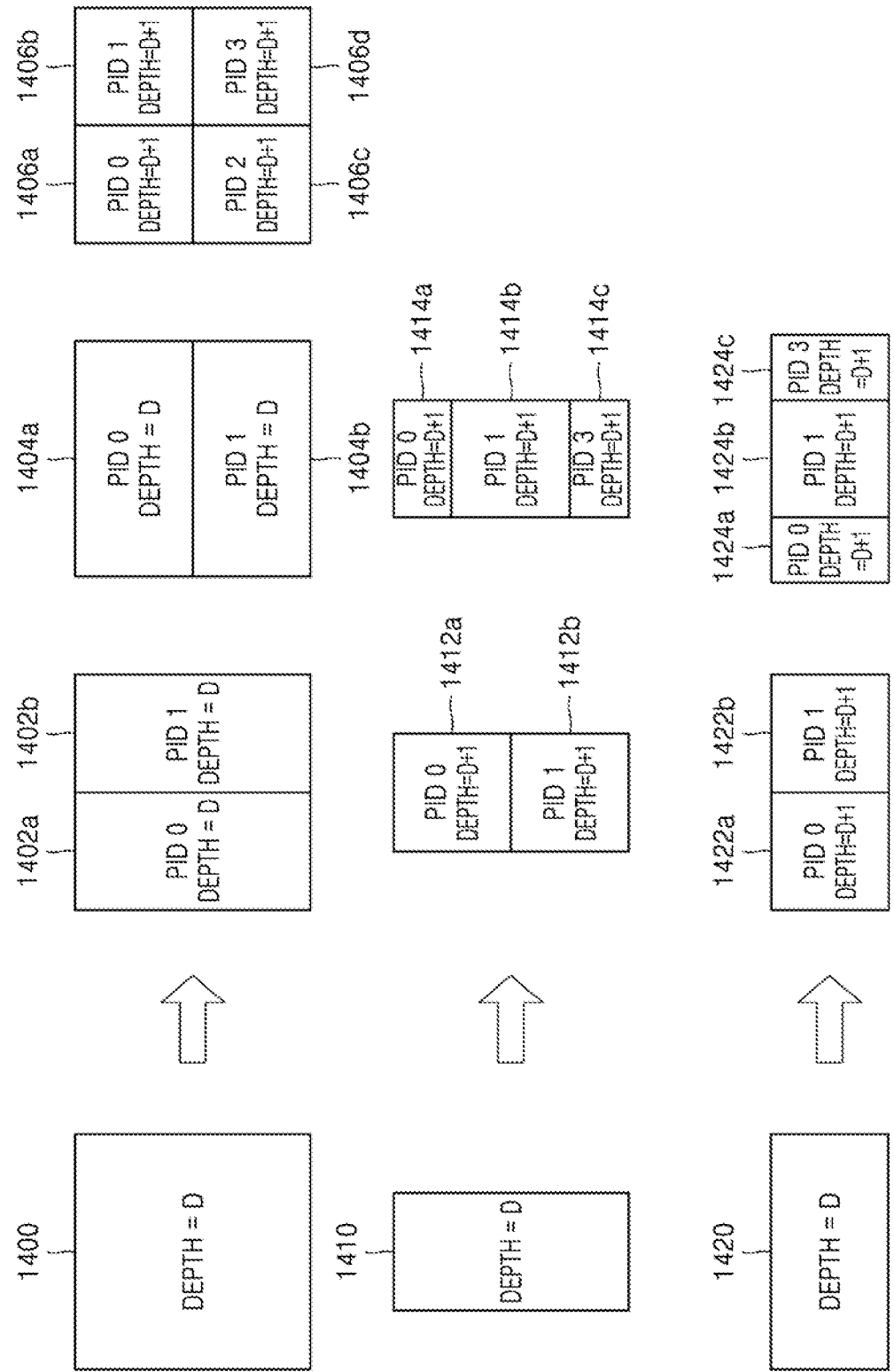
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
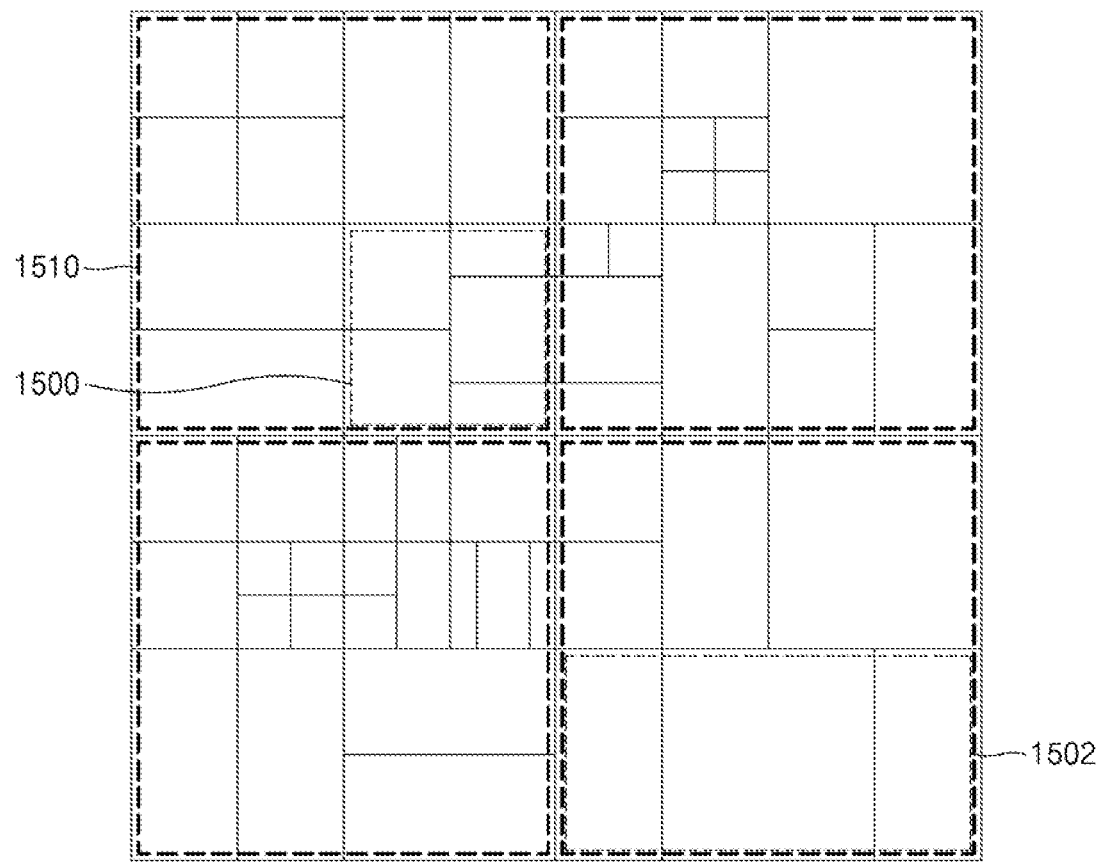
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
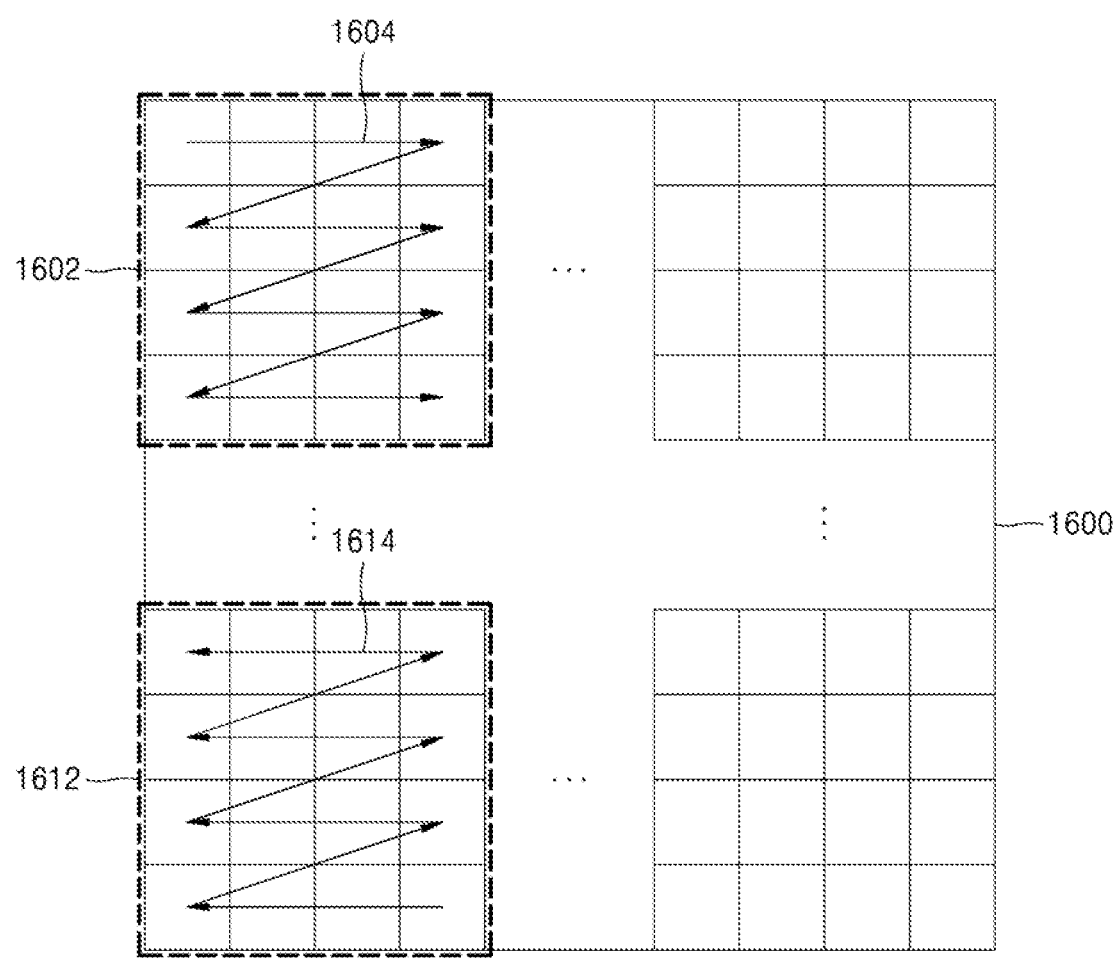
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be pre-determined between the image decoding apparatus 100 and the image encoding apparatus 2800. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, and a slice segment header. The image decoding apparatus 100 may determine the split rule differently according to frames, slices, temporal layers, largest coding units, or coding units.

The image decoding apparatus 100 may determine the split rule based on block shape information of a coding unit. A block shape may include a size, shape, a ratio of width and height, and a direction of the coding unit. The image encoding apparatus 2800 and the image decoding apparatus 100 may pre-determine to determine the split rule based on the block shape information of the coding unit. However, an embodiment is not limited thereto. The image decoding apparatus 100 may determine the split rule based on the information obtained from the bitstream received from the image encoding apparatus 2800.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 2800 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 12, details thereof are not provided again.

A method of determining an encoding order of a current block and applying an adaptive motion vector resolution (AMVR) mode according to the encoding order will be described with reference to FIGS. 17 through 28.

Figure 17:
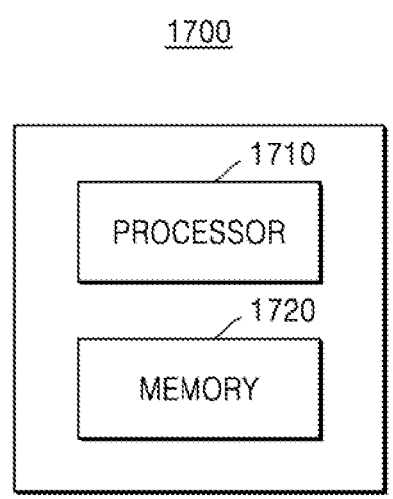
FIG. 17 illustrates a video decoding apparatus according to an embodiment related to splitting of a current block and determining of an encoding order of split lower blocks.

FIG. 17 illustrates a video decoding apparatus 1700 according to an embodiment related to splitting of a current block and encoding of split lower blocks.

The video decoding apparatus 1700 includes a processor 1710 and a memory 1720. In FIG. 17, the processor 1710 and the memory 1720 are represented by component units located in one apparatus, but the processor 1710 and the memory 1720 need not necessarily be physically adjacent to each other. Thus, according to an embodiment, the processor 1710 and the memory 1720 may be distributed. In FIG. 17, the processor 1710 is represented as a single component, but according to an embodiment, a plurality of processors may be included in the video decoding apparatus 1700.

Functions performed by the processor 1710 of FIG. 17 may be performed by the decoder 120 of FIG. 1.

The processor 1710 may obtain split information indicating whether to split a current block. The split information indicates whether to split the current block into two or more smaller blocks. Also, when the split information indicates to split the current block, the processor 1710 splits the current block into two or more lower blocks.

The current block may be split into various shapes based on a shape of the current block. For example, when the current block is a square, the current block may be split into four square lower blocks according to the split information of the current block.

When two or more splitting methods are allowed for the shape of the current block, the processor 1710 may select a splitting method according to split shape information. Accordingly, when the split information indicates to split the current block, the processor 1710 may obtain the split shape information indicating the splitting method of the current block. Also, the processor 1710 may split the current block according to the splitting method indicated by the split shape information.

For example, when the current block is a square of 2N×2N size, the split shape information may indicate the splitting method applied to the current block from among N×N splitting, N×2N splitting, 2N×N splitting, vertical unequal ternary splitting, and horizontal unequal ternary splitting. The N×N splitting is a method of splitting the current block into four blocks of N×N sizes. The N×2N splitting is a method of splitting the current block into blocks of N×2N sizes. The 2N×N splitting is a method of splitting the current block into blocks of 2N×N sizes. The vertical unequal ternary splitting denotes a method of splitting a block of a 2N×2N size into three blocks having the same width and a height ratio of 1:2:1. The horizontal unequal ternary splitting denotes a method of splitting a block of a 2N×2N size into three blocks having the same height and a width ratio of 1:2:1. In addition, the current block may be split by one of various horizontal splitting methods or vertical splitting methods.

When the current block is an N×2N rectangle long in a vertical direction, the split shape information may indicate a splitting method applied to the current block among the N×N splitting and the vertical unequal ternary splitting. The N×N splitting is a method of splitting the current block into two blocks of N×N sizes. The vertical unequal ternary splitting denotes a method of splitting a block of an N×2N size into three blocks having the same width and a height ratio of 1:2:1. In addition, the current block may be split by one of various horizontal splitting methods or vertical splitting methods.

When the current block is a 2N×N rectangle long in a horizontal direction, the split shape information may indicate a splitting method applied to the current block among the N×N splitting and the horizontal unequal ternary splitting. The N×N splitting is a method of splitting the current block into two blocks of N×N sizes. The horizontal unequal ternary splitting denotes a method of splitting a block of a 2N×N size into three blocks having the same height and a width ratio of 1:2:1. In addition, the current block may be split by one of various horizontal splitting methods or vertical splitting methods.

In addition to the above splitting methods, a method of splitting the current block by an asymmetric ratio, a method of splitting into triangles, and a splitting method into other geometric shapes may be used to split the current block of a square or rectangular size.

When the split information does not indicate to split the current block, the processor 1710 does not split the current block. Also, the processor 1710 decodes the current block.

When the current block is a coding unit, the processor 1710 determines the current block as a final coding unit. The final coding unit is no longer split into coding units of larger depths. According to an embodiment, the processor 1710 may split the current block that is the final coding unit into a data unit other than a coding unit.

According to an embodiment, the processor 1710 may split the current block into one or more prediction units according to a hierarchical tree structure. Similarly, the processor 1710 may split the current block into one or more transform units according to a hierarchical tree structure. Then, the processor 1710 may reconstruct the current block according to a prediction result regarding the prediction unit and a transform result regarding the transform unit.

When the current block is a prediction unit, the processor 1710 may perform prediction on the current block. When the current block is a transform unit, the processor 1710 may obtain residual data by inverse-quantizing and inverse-transforming a quantized transform coefficient of the current block.

The processor 1710 obtains encoding order information indicating an encoding order of lower blocks. Also, the processor 1710 may determine a decoding order of the lower blocks according to the obtained encoding order information.

The encoding order information indicates an encoding order of the two or more lower blocks included in the current block. A data amount of the encoding order information is determined according to the number of lower blocks and an encoding order determining method.

For example, when there are two lower blocks, the encoding order information may be determined to indicate a lower block that is first encoded among the two lower blocks. Accordingly, the encoding order information may have a form of a flag having a data amount of 1 bit.

However, when there are four lower blocks, the number of cases of an encoding order of the lower blocks is 4!=24. Thus, to indicate the 24 encoding orders, a data amount of 5 bits is required. In other words, when the number of lower blocks is increased, the number of cases of the encoding order is increased. Accordingly, in order to reduce the data amount of encoding order information, an encoding order determining method may be used in which an encoding order is determined by determining whether an encoding order of some lower block pairs is swapped in a predetermined basic encoding order. The encoding order information indicating whether the encoding order of the lower block pairs is swapped indicates whether the basic encoding order is a forward direction or a reverse direction.

Figure 18A:
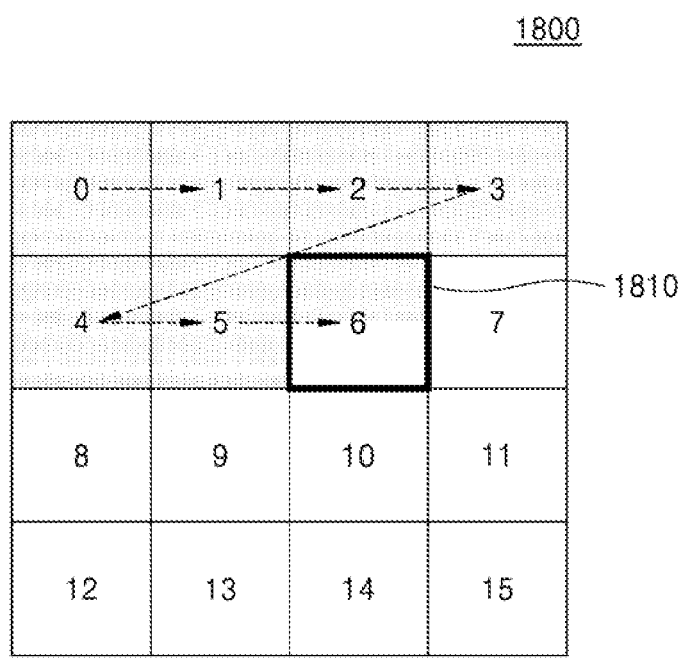
FIGS. 18A through 18C illustrate a basic encoding order according to an embodiment.
Figure 18B:
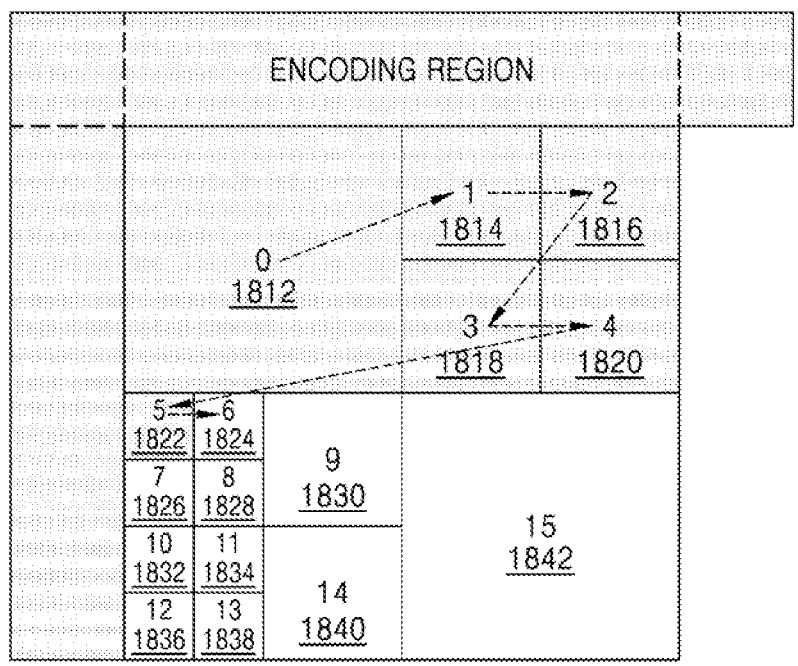
Figure 18C:
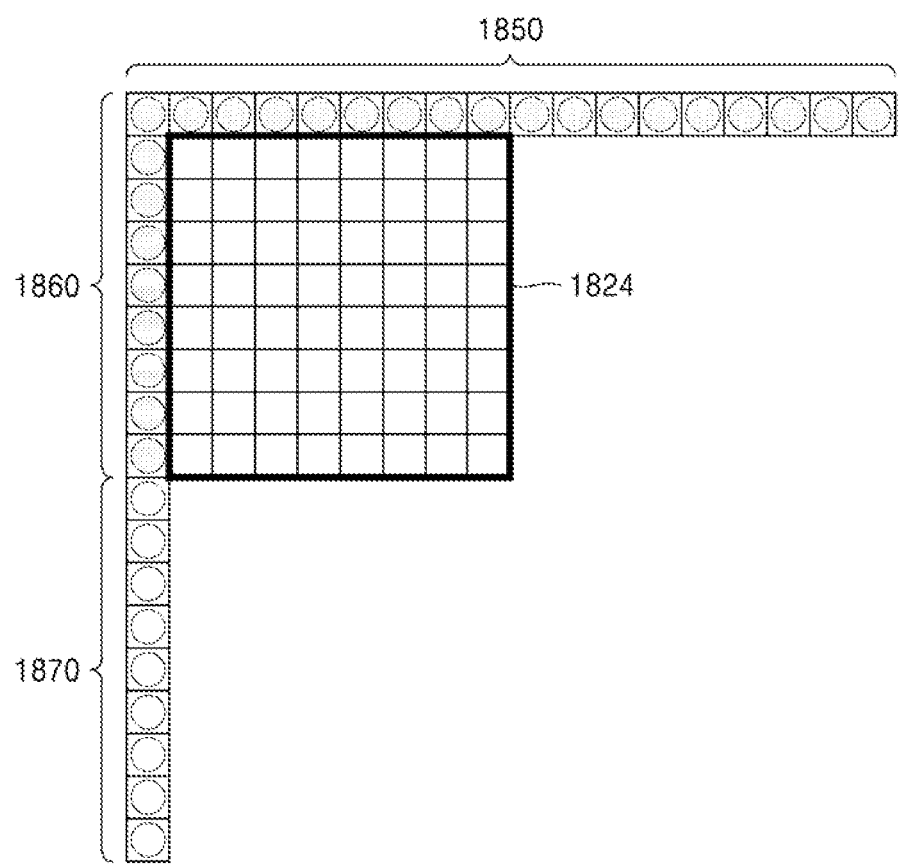

A current picture including the current block is encoded and decoded according to the basic encoding order. All blocks and pixels encoded and decoded in the current picture are encoded and decoded according to the basic encoding order in the same level. Thus, the lower blocks of the same level split from the current block are also encoded and decoded according to the basic encoding order. An embodiment of the basic encoding order is illustrated in FIGS. 18A through 18C described below.

Thus, when the lower block pairs are encoded according to the basic encoding order, it is said that the lower block pairs are encoded in a forward direction. On the other hand, when the lower block pairs are encoded in a reverse order of the basic encoding order, it is said that the lower block pairs are encoded in a reverse direction.

For example, when the two lower blocks are adjacent to each other in a horizontal direction and encoded in the forward direction, the encoding order information may be determined such that a left lower block is decoded first. On the other hand, when the two lower blocks adjacent in the horizontal direction are encoded in the reverse direction, the encoding order information may be determined such that a right lower block is decoded first.

Similarly, when the two lower blocks are adjacent to each other in a vertical direction and encoded in the forward direction, the encoding order information may be determined such that an upper lower block is decoded first. On the other hand, when the two lower blocks adjacent in the vertical direction are encoded in the reverse direction, the encoding order information may be determined such that a lower block is decoded first.

When the encoding order information indicates only an encoding order of the lower block pairs, the encoding order information has the data amount of 1 bit. The encoding order information having the data amount of 1 bit may be defined as an encoding order flag.

The processor 1710 may obtain the encoding order information from a bitstream. The encoding order information may be located after the split information in the bitstream.

The processor 1710 may implicitly determine the encoding order information according to a surrounding environment of the current block. The encoding order information may be determined based on whether neighboring blocks adjacent to the current block are encoded. For example, the processor 1710 may determine, among the lower blocks, a lower block having many adjacent neighboring blocks to be decoded first.

In relation to the processor 1710, FIGS. 18A through 18C illustrate the basic decoding order according to an embodiment. The basic encoding order of FIGS. 18A through 18C is a Z-encoding order. According to the Z-encoding order, data units are encoded in a direction from left to right, and when all data units of a current row are encoded, data units included in a row below the current row are encoded in a direction from left to right. The Z-encoding order described above is referred to as a raster scan order.

In FIG. 18A, encoding orders according to a Z-encoding order of largest coding units included in a current picture 1800 are illustrated. The largest coding units are indexed from 0 to 15 according to the Z-encoding order. According to the Z-encoding order, the largest coding units of a first row indexed from 0 to 3 are encoded first, and the largest coding units of a second row indexed from 4 to 7 are encoded in a direction from left to right. The largest coding units are also internally encoded according to the Z-encoding order.

FIG. 18B illustrates an encoding order of a largest coding unit 1810 of an index 6 among the largest coding units included in the current picture 1800. Coding units of a final depth of which splitting is completed according to the Z-encoding order may be indexed from 0 to 15. The Z-encoding order is applied with respect to data units of the same depth. Also, a posterior coding unit of a depth n is not encoded until lower coding units of a coding unit of the depth n are all encoded. For example, the coding unit of the index 15 is not encoded until the coding units of the indexes 5 to 14 are all encoded. The coding units are also internally encoded according to the Z-encoding order.

FIG. 18C illustrates a reference sample referred to by a coding unit 1824 of an index 6 among the coding units included in the largest coding unit 1810. Only a coding unit 1812 of an index 0 and a coding unit 1822 of an index 5 are reconstructed around the coding unit 1824 of the index 6 that is being currently encoded. Accordingly, only a pixel 1850 of the coding unit 1812 and a pixel 1860 of the coding unit 1822 may be used as reference samples for the coding unit 1824.

The Z-encoding order of FIGS. 18A through 18C may be applied in a different direction according to data units. For example, the Z-encoding order may be changed to encode data units in a direction from right to left in the same row. Also, the Z-encoding order may be changed to encode data units included in a row above a current row after all data units of the current row are encoded. Also, the Z-encoding order may be changed to encode data units from top to bottom in the same column, encode all data units of a current column, and then encode data units included in a right column of the current column.

Figure 19A:
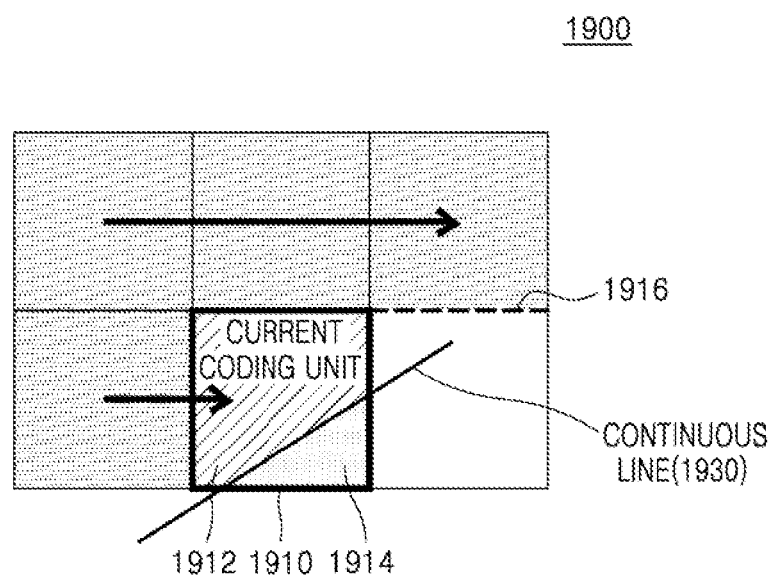
FIGS. 19A and 19B respectively illustrate a case where a coding unit is encoded in a forward direction and a case where a coding unit is encoded in a reverse direction.
Figure 19B:
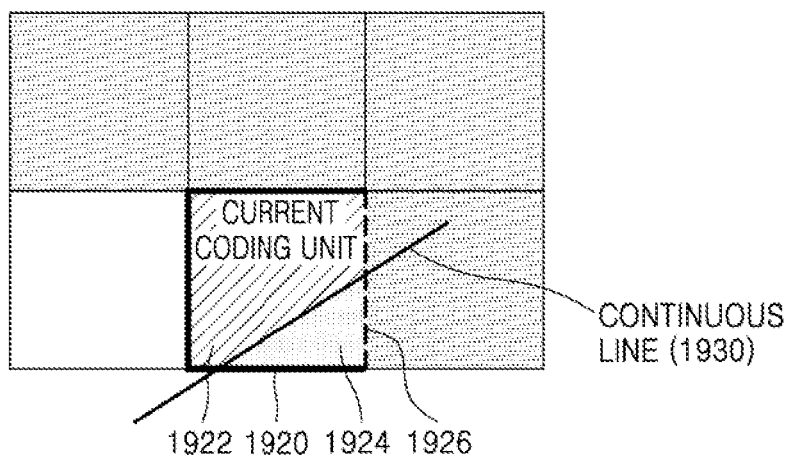

In relation to the processor 1710, FIGS. 19A and 19B respectively illustrate a case 1900 in which a coding unit 1910 is encoded in a forward direction and a case 1902 in which a coding unit 1920 is encoded in a reverse direction. Advantages achieved by changing an encoding order will be described with reference to FIGS. 19A and 19B.

The coding units 1910 and 1920 of FIGS. 19A and 19B are predicted according to an intra mode in an upper right direction. A continuous line 1930 of FIGS. 19A and 19B are pixels having a constant value arranged in a straight line in an original image. Thus, when a current coding unit is predicted in a direction of the continuous line 1930, prediction accuracy of the coding units 1910 and 1920 will be improved.

In the case 1900 of encoding in the forward direction, a left coding unit, an upper coding unit, and an upper right coding unit of the current coding unit 1910 are reconstructed before the current coding unit 1910. Thus, the current coding unit 1910 refers to pixels or encoding information of the left coding unit, the upper coding unit, and the upper right coding unit. For example, pixels 1916 located at a lower corner of the upper right coding unit are predicted for prediction of the current coding unit 1910. The pixels 1916 are spatially separated from the current coding unit 1910, and thus prediction accuracy of a portion 1914 of the current coding unit 1910 may be low.

However, in the case 1902 of encoding in the reverse direction, because a right coding unit, an upper coding unit, and an upper left coding unit of the current coding unit 1920 are reconstructed before the current coding unit 1920, pixels 1926 located at a left corner of the right coding unit may be used for prediction of the current coding unit 1920 in the intra prediction. Because the pixels 1926 are adjacent to the current coding unit 1920, prediction accuracy of a portion 1924 of the current coding unit 1920 may be higher than that of the portion 1914 of the current coding unit 1910.

Like the embodiment related to the intra prediction described with reference to FIGS. 19A and 19B, there are many cases for increasing the prediction accuracy even for inter prediction by obtaining encoding information from a block located in a reverse direction. When a current coding unit and a right coding unit of the current coding unit are coding units for the same object, motion information of the current coding unit and that of the right coding unit may be similar. Thus, encoding efficiency may be increased by deriving the motion information of the current coding unit from that of the right coding unit.

Accordingly, encoding efficiency of an image may be improved by comparing encoding efficiency when the current coding unit is encoded in a forward direction and encoding efficiency when the current coding unit is encoded in a reverse direction to determine an encoding order.

Encoding order information may be configured identically as encoding order information applied to a higher block of a current block. For example, when the current block is a prediction unit or a transform unit, the processor 1710 may apply encoding order information applied to a coding unit included in the current block to the current block. As another example, when the current block is a coding unit, the processor 1710 may apply encoding order information applied to a coding unit of a depth lower than that of the current block to the current block.

When there are two or more encoding order flags for the current block, the processor 1710 may obtain only one encoding order flag from a bitstream and determine a remaining encoding order flag to associate with the encoding order flag obtained from the bitstream.

Figure 20:
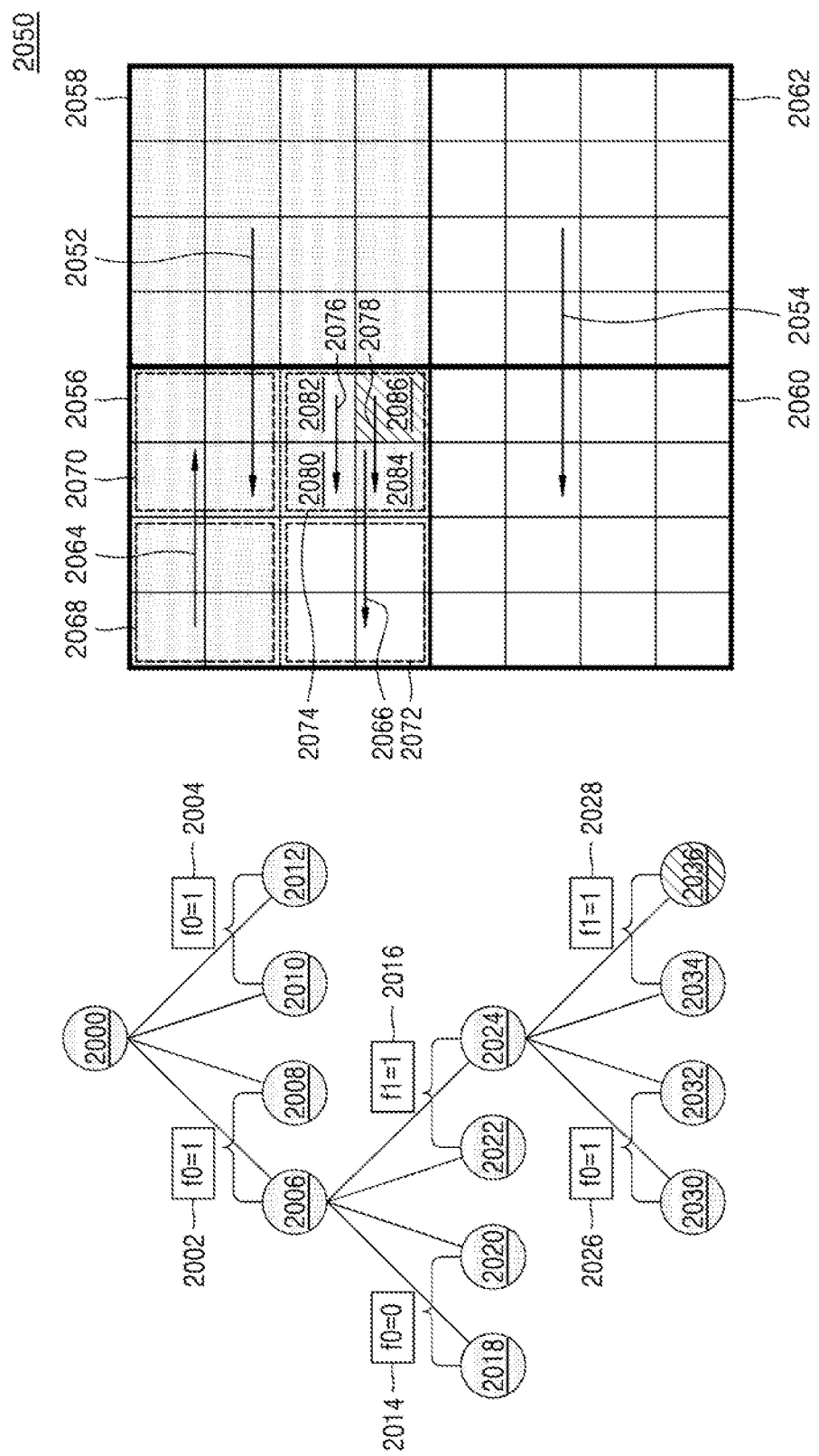
FIG. 20 illustrates a tree structure of a largest coding unit for describing an encoding order of the largest coding unit and coding units included in the largest coding unit.

In relation to determining of an encoding order of the processor 1710, FIG. 20 illustrates a tree structure of a largest coding unit for describing an encoding order of the largest coding unit and coding units included in the largest coding unit.

A largest coding unit 2050 is split into a plurality of coding units 2056, 2058, 2060, 2062, 2068, 2070, 2072, 2074, 2080, 2082, 2084, and 2086. The largest coding unit 2050 corresponds to an uppermost node 2000 of a tree structure. Also, the plurality of coding units 2056, 2058, 2060, 2062, 2068, 2070, 2072, 2074, 2080, 2082, 2084, and 2086 respectively correspond to a plurality of nodes 2006, 2008, 2010, 2012, 2018, 2020, 2022, 2024, 2030, 2032, 2034, and 2036. Upper encoding order flags 2002, 2014, and 2026 indicating an encoding order in the tree structure respectively correspond to arrows 2052, 2064, and 2076, and upper encoding order flags 2004, 2016, and 2028 respectively correspond to arrows 2054, 2066, and 2078.

An upper encoding order flag indicates an encoding order of two coding units located at the top among four coding units of the same depth. When an upper encoding order flag is 0, encoding is performed in a forward direction. On the other hand, when an upper encoding order flag is 1, encoding is performed in a reverse direction.

Similarly, a lower encoding order flag indicates an encoding order of two coding units located at the bottom among four coding units of the same depth. When a lower encoding order flag is 0, encoding is performed in a forward direction. On the other hand, when a lower encoding order flag is 1, encoding is performed in a reverse direction.

For example, because the upper encoding order flag 2014 is 0, an encoding order between the coding units 2068 and 2070 is determined to be the forward direction, i.e., a direction from left to right. Also, because the lower encoding order flag 2016 is 1, an encoding order between the coding units 2072 and 2074 is determined to be the reverse direction, i.e., a direction from right to left.

According to an embodiment, an upper encoding order flag and a lower encoding order flag may be set to have the same value. For example, when the upper encoding order flag 2002 is determined as 1, the lower encoding order flag 2004 corresponding to the upper encoding order flag 2002 may be determined as 1. Because values of the upper encoding order flag and the lower encoding order flag are determined as 1 bit, an information amount of encoding order information is decreased.

According to an embodiment, an upper encoding order flag and a lower encoding order flag of a current coding unit may be determined by referring to at least one of an upper encoding order flag and a lower encoding order flag applied to a coding unit of a depth lower than that of the current coding unit. For example, the upper encoding order flag 2026 and the lower encoding order flag 2028 applied to the coding units 2080, 2082, 2084, and 2086 may be determined based on the lower encoding order flag 2016 applied to the coding units 2072 and 2074. Accordingly, the upper encoding order flag 2026 and the lower encoding order flag 2028 may be determined to have the same value as the lower encoding order flag 2016. Because values of an upper encoding order flag and lower encoding order flag are determined from an upper encoding unit of a current coding unit, encoding order information is not obtained from a bitstream. Accordingly, an information amount of the encoding order information is reduced.

In relation to the determining of the encoding order of the processor 1710, how an encoding order of three or more blocks arranged in a vertical or horizontal direction is changed according to an encoding order flag will be described with reference to FIGS. 21A and 21B.

Figure 21A:
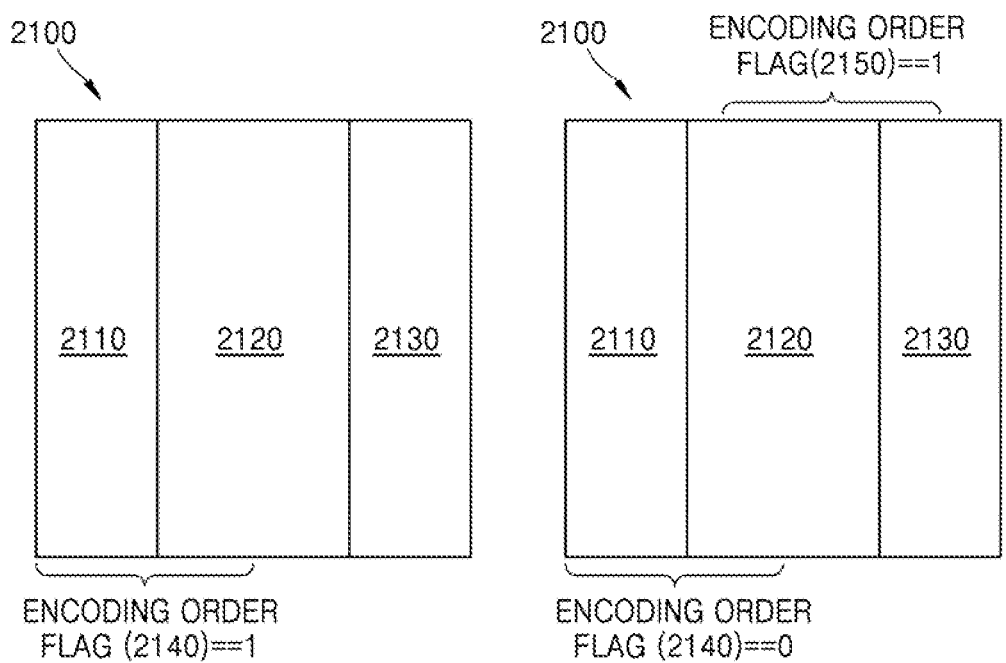
FIGS. 21A and 21B are for describing how an encoding order of three or more blocks arranged in a vertical or horizontal direction is changed according to an encoding order flag.

An embodiment of FIG. 21A is related to a method of swapping an encoding order based on an encoding order flag only when encoding orders of spatially adjacent coding units are adjacent to each other.

A coding unit 2100 is split into three coding units 2110, 2120, and 2130. When a basic encoding order is a direction from left to right, encoding is performed in an order of the coding unit 2110, the coding unit 2120, and the coding unit 2130. However, an encoding order may change according to encoding order flags 2140 and 2150.

The encoding order flag 2140 indicates an encoding order of the coding unit 2110 and the coding unit 2120. When the encoding order flag 2140 is 0, the encoding order of the coding unit 2110 and the coding unit 2120 is determined as a forward direction. Thus, the coding unit 2110 is encoded before the coding unit 2120. However, when the encoding order flag 2140 is 1, the encoding order of the coding unit 2110 and the coding unit 2120 is determined as a reverse direction, and thus the coding unit 2120 is encoded before the coding unit 2110.

The encoding order flag 2150 indicates an encoding order of the coding unit 2120 and the coding unit 2130. The encoding order flag 2150 is obtained when the encoding order flag 2140 indicates the forward direction. When the encoding order flag 2140 indicates the reverse direction, the encoding orders of the coding unit 2120 and the coding unit 2130 are not adjacent to each other, and thus the encoding order flag 2150 is not obtained. When the encoding order flag 2150 is 0, the encoding order of the coding unit 2120 and the coding unit 2130 is determined as a forward direction. Thus, the coding unit 2120 is encoded before the coding unit 2130. However, when the encoding order flag 2150 is 1, the encoding order of the coding unit 2120 and the coding unit 2130 is determined as a reverse direction, and thus the coding unit 2130 is encoded before the coding unit 2120.

According to an embodiment of FIG. 21A, there are three cases for an encoding order of three coding units. Accordingly, one or two encoding order flags are used to determine an encoding order.

Figure 21B:
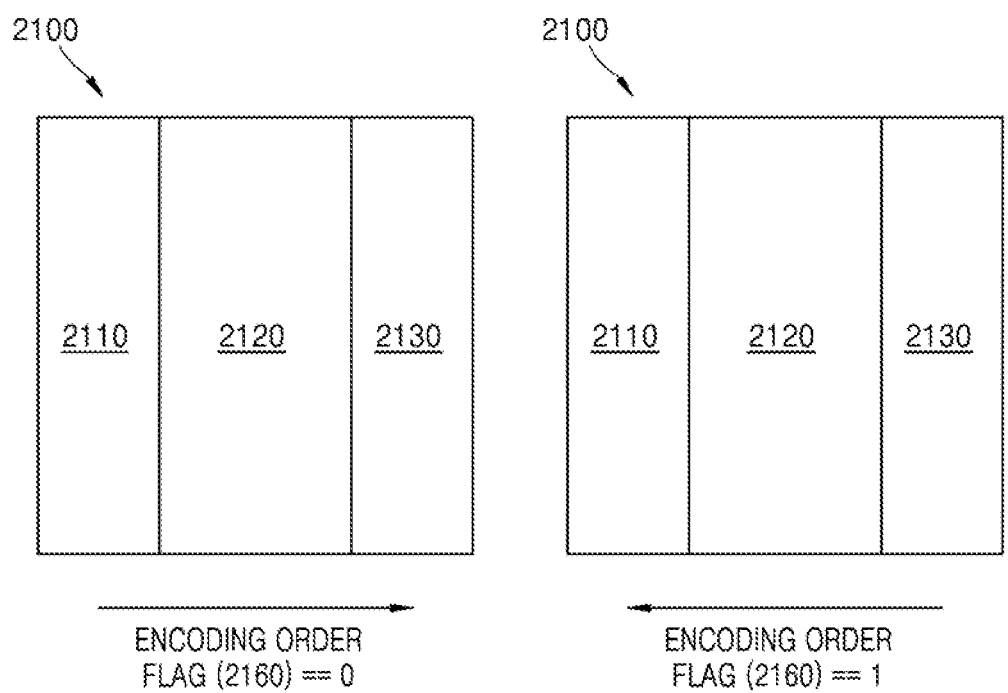

An embodiment of FIG. 21B is related to a method of determining an encoding order based on an encoding order flag 2160 indicating a direction of an encoding order applied to three coding units.

The encoding order flag 2160 indicates whether the encoding order is a forward direction or a reverse direction. For example, when the encoding order flag 2160 is 0, the encoding order of the coding units 2110, 2120, and 2130 may be determined as the forward direction. Thus, when the encoding order flag 2160 is 0, the encoding may be performed in an order of the coding unit 2110, the coding unit 2120, and the coding unit 2130.

On the other hand, when the encoding order flag 2160 is 1, the encoding order of the coding units 2110, 2120, and 2130 may be determined as the reverse direction. Thus, when the encoding order flag 2160 is 1, the encoding may be performed in an order of the coding unit 2130, the coding unit 2120, and the coding unit 2110.

According to the embodiment of FIG. 21B, there are two cases for an encoding order of three coding units. Accordingly, one encoding order flag is used to determine an encoding order.

The methods of determining an encoding order used in the embodiments of FIGS. 21A and 21B may be applied with respect to four or more coding units.

The processor 1710 may identify encoding order change permission information for a higher data unit of a current block. The encoding order change permission information indicates whether a change of an encoding order is allowed for blocks included in the higher data unit of the current block. When the encoding order change permission information does not allow the change of the encoding order, all blocks of the higher data unit are decoded according to a basic encoding order. When the encoding order change permission information indicates that encoding order information of the current block is encoded, the processor 1710 may obtain the encoding order information.

The encoding order change permission information may be included in a video parameter set, a sequence parameter set, a picture parameter set, a slice segment header, or a largest coding unit header. Also, when there are two or more types of encoding order information, the pieces of encoding order change permission information for the pieces of encoding order information may be stored in different headers.

The encoding order change permission information may indicate a depth or block size through which the encoding order information is provided. For example, the processor 1710 may obtain the encoding order information only when a depth of the current block is included in a depth indicated by the encoding order change permission information. As another example, the processor 1710 may obtain the encoding order information only when the depth of the current block is a block size indicated by the encoding order change permission information.

When split information does not indicate to split the current block, the processor 1710 may determine a prediction method of the current block according to encoding information of the current block and decoding of neighboring blocks of the current block.

The encoding information of the current block may indicate how the current block is predicted. In particular, the encoding information may indicate one prediction method among a plurality of intra prediction modes and inter prediction modes. Accordingly, the processor 1710 may determine a prediction mode applied to the current block according to the encoding information of the current block.

An affine mode may be applied to the current block. The affine mode is an inter prediction method of obtaining a motion vector of samples included in a current block by performing affine transformation on motion vectors obtained from adjacent samples of the current block. According to an embodiment, an affine-transformed motion vector may be obtained in units of a sub-block included in the current block. A method of determining a motion vector of a current block according to affine transformation will be described below with reference to FIG. 22.

The processor 1710 may obtain affine inter mode permission information indicating whether an affine inter mode is allowed for a high level unit of a current block. Also, the processor 1710 may obtain affine merge mode permission information indicating whether an affine merge mode is allowed for the high level unit of the current block. Alternatively, the processor 1710 may obtain affine mode permission information indicating whether all prediction modes to which affine transformation is applied are allowed for the high level unit of the current block. The processor 1710 may obtain affine type permission information indicating an affine type allowed for the high level unit of the current block. The high level unit may be one of a video parameter set, a sequence parameter set, a picture parameter set, and a slice header.

In the affine inter mode, reference picture information is obtained from a bitstream and an affine parameter group is obtained from an adjacent block of the current block. Also, the affine parameter group is corrected according to affine parameter correction information. The current block is predicted according to a corrected affine parameter and a reference picture.

In an affine merge mode, the reference picture and the affine parameter group are obtained from the adjacent block of the current block. Also, the affine parameter group is used for prediction of the current block together with the reference picture, without the affine parameter group being corrected.

When an inter mode is applied to the current block and the affine inter mode is allowed for the current block, the processor 1710 may obtain affine inter information indicating whether the affine inter mode is applied to the current block. When the affine inter information indicates that the affine inter mode is applied to the current block, the processor 1710 decodes the current block according to the affine inter mode.

When a merge mode is applied to the current block and the affine merge mode is allowed for the current block, the processor 1710 may obtain affine merge information indicating whether the affine merge mode is applied to the current block. When the affine merge information indicates that the affine merge mode is applied to the current block, the processor 1710 decodes the current block according to the affine merge mode.

The processor 1710 may obtain affine type information from the bitstream. The affine type information indicates an affine type applied to the current block. The affine type applicable to the current block may include a 6 parameter affine mode, a 4 parameter affine mode, and a 3 parameter affine mode. The processor 1710 may select one of the affine types allowed for the current block based on the affine type information, according to the affine type permission information. The 6 parameter affine mode, the 4 parameter affine mode, and the 3 parameter affine mode will be described in detail later with reference to FIG. 22.

The processor 1710 may obtain affine parameter information indicating an affine parameter group of the current block from among affine parameter group candidates, from the bitstream.

The processor 1710 may obtain the affine parameter group candidates of the current block based on whether adjacent blocks of the current block including at least a right block of the current block are decoded. An affine parameter is determined according to an x component and a y component of a motion vector. The affine parameter group indicates a group of affine parameters required to predict the current block, and the affine parameter group candidate indicates an affine parameter group applicable to the current block. A method of determining the affine parameter group candidate will be described below with reference to FIGS. 23 through 27.

The processor 1710 may determine the affine parameter group candidate used in the affine mode from several sample locations of the current block. In particular, the processor 1710 may determine an upper left coordinate of the current block as a first affine parameter extraction location, and determine an upper right coordinate of the current block as a second affine parameter extraction location. Also, the processor 1710 may obtain a first motion vector from at least one adjacent block adjacent to the first affine parameter extraction location, and obtain a second motion vector from at least one adjacent block adjacent to the second affine parameter extraction location.

When right and left blocks of the current block are both not decoded, the processor 1710 may obtain a third motion vector from the first and second motion vectors. Alternatively, when the current block is in a 4 parameter affine mode or a 3 parameter affine mode, the processor 1710 may obtain the third motion vector from the first and second motion vectors.

When the left block of the current block is decoded and the right block of the current block is not decoded, the processor 1710 may determine a lower left coordinate of the current block as a third affine parameter extraction location. Also, the processor 1710 may obtain the third motion vector from one or more adjacent blocks adjacent to the third affine parameter extraction location.

When the right block of the current block is decoded and the left block of the current block is not decoded, the processor 1710 may determine a lower right coordinate of the current block as the third affine parameter extraction location. Also, the processor 1710 may obtain the third motion vector from one or more adjacent blocks adjacent to the third affine parameter extraction location.

Also, the processor 1710 may obtain the affine parameter group candidate according to the obtained first through third motion vectors.

When right and left blocks of the current block are both decoded, the processor 1710 may determine a lower left coordinate of the current block as the third affine parameter extraction location and determine a lower right coordinate of the current block as a fourth affine parameter extraction location. The processor 1710 may obtain the third motion vector from at least one adjacent block adjacent to the third affine parameter extraction location, and obtain a fourth motion vector from at least one adjacent block adjacent to the fourth affine parameter extraction location. Also, the processor 1710 may obtain at least one of a first affine parameter group candidate obtained from the first through third motion vectors, a second affine parameter group candidate obtained from the first, second, and fourth motion vectors, and a third affine parameter group candidate determined from the first and second affine parameter group candidates.

A method of determining the affine parameter group candidate from several sample locations of the current block will be described in detail below with reference to FIG. 23.

The processor 1710 may determine the affine parameter group candidate from one adjacent block decoded according to the affine mode. According to an embodiment, the processor 1710 may scan an adjacent block reconstructed in the affine mode among adjacent blocks of the current block, according to a scan order. Also, the processor 1710 may determine the affine parameter group candidate from the adjacent block reconstructed in the affine mode, the adjacent block being scanned first according to the scan order. According to an embodiment, the processor 1710 may determine the scan order according to whether the adjacent blocks of the current block are decoded. Alternatively, the processor 1710 may determine the scan order according to an encoding order of the current block.

To obtain the affine parameter group candidate according to the embodiment, the processor 1710 may obtain reference motion vectors from an upper left location, upper right location, and lower left location of the adjacent block. Also, the processor 1710 may obtain a horizontal change amount from a difference between the reference motion vectors of the upper left location and the upper right location. Similarly, the processor 1710 may obtain a vertical change amount from a difference between the reference motion vectors of the upper left location and the lower left location. Also, the processor 1710 may obtain the affine parameter group candidate of the current block according to the horizontal change amount, the vertical change amount, and the reference motion vectors of the upper left location.

A method of determining the affine parameter group candidate from one adjacent block decoded according to the affine mode will be described below with reference to FIG. 24.

The processor 1710 may determine the affine parameter group candidate from a plurality of adjacent block decoded according to the affine mode. The processor 1710 may determine the first motion vector and a first motion vector extraction location from a first adjacent block decoded in the affine mode, the first adjacent block being first discovered in a scan process of scanning the adjacent blocks of the current block according to a first scan order from an adjacent block adjacent to the upper left coordinate of the current block. Also, the processor 1710 may determine the second motion vector and a second motion vector extraction location from a second adjacent block decoded in the affine mode, the second adjacent block being first discovered in a scan process of scanning the adjacent blocks of the current block according to a second scan order from an adjacent block adjacent to the upper right coordinate of the current block.

When the right and left blocks of the current block are both not decoded, the processor 1710 may determine the third motion vector and a third motion vector extraction location from the first or second adjacent block.

When the left block of the current block is decoded and the right block of the current block is not decoded, the processor 1710 may determine the third motion vector and the third motion vector extraction location from a third adjacent block decoded in the affine mode, the third adjacent block being first discovered in a scan process of scanning the adjacent blocks of the current block according to a third scan order from an adjacent block adjacent to the lower left coordinate of the current block.

When the right block of the current block is decoded and the left block of the current block is not decoded, the processor 1710 may determine the third motion vector and the third motion vector extraction location from a fourth adjacent block decoded in the affine mode, the fourth adjacent block being first discovered in a scan process of scanning the adjacent blocks of the current block according to a fourth scan order from an adjacent block adjacent to the lower right coordinate of the current block.

The processor 1710 may obtain the affine parameter group candidate according to the first through third motion vectors of the current block and the first through third motion vector extraction locations. The first through fourth scan orders are determined according to whether the adjacent block of the current block is decoded.

When the right and left blocks of the current block are both decoded, the processor 1710 may obtain at least one of the first affine parameter group candidate obtained when the left block is decoded and the right block is not decoded, the second affine parameter group candidate obtained when the right block is decoded and the left block is not decoded, and the third affine parameter group candidate obtained from the first and second affine parameter group candidates.

A method of determining the affine parameter group candidate from a plurality of adjacent blocks decoded according to the affine mode will be described below with reference to FIGS. 25 through 27.

The processor 1710 may determine one or more affine parameter group candidates according to the method described above. When there are two or more affine parameter group candidates, the processor 1710 may obtain the affine parameter information of the current block from the bitstream. Also, the processor 1710 may determine the affine parameter group of the current block from among the plurality of affine parameter group candidates, according to the affine parameter information.

The processor 1710 may obtain the affine parameter correction information of the current block. Also, the processor 1710 may correct the affine parameters included in the affine parameter group according to the affine parameter correction information. When the prediction mode of the current block is the affine merge mode, the obtaining of the affine parameter correction information and the correcting of the affine parameter are omitted.

The processor 1710 may reconstruct the current block based on the one or more affine parameters included in the affine parameter group.

Figure 22:
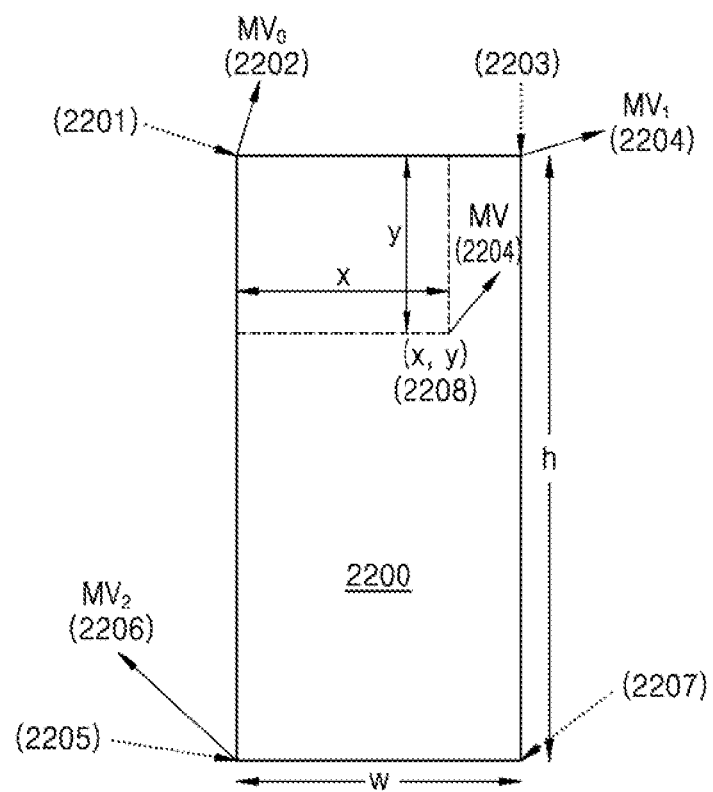
FIG. 22 is for describing in detail a method of deriving a motion vector applied to a sample of a current block in an affine mode.

FIG. 22 is for describing in detail a method of deriving a motion vector applied to a sample of a current block 2200 in an affine mode.

In the affine mode, at least three affine parameters are required to derive the motion vector of the sample of the current block 2200. In particular, the affine mode may include a 6 parameter affine mode, a 4 parameter affine mode, and a 3 parameter affine mode. Hereinafter, a method of deriving the motion vector of the sample of the current block 2200 according to each affine mode will be described.

In the 6 parameter affine mode, the processor 1710 may obtain three motion vectors, i.e., first through third motion vectors 2202 through 2206, from neighboring samples at an upper left coordinate 2201, an upper right coordinate 2203, and a lower left coordinate 2205. The first motion vector 2202 may be obtained from the neighboring samples at the upper left coordinate 2201 of the current block 2200. Also, the second motion vector 2204 may be obtained from the neighboring samples of the upper right coordinate 2203 of the current block 2200. Also, the third motion vector 2206 may be obtained from the neighboring samples of the lower left coordinate 2205 of the current block 2200. In FIG. 22, the third motion vector 2206 is obtained based on the lower left coordinate 2205 of the current block 2200, but according to an embodiment, the third motion vector 2206 may be obtained based on a lower right coordinate 2207 of the current block 2200. Also, the processor 1710 may determine x and y components of the first motion vector 2202, x and y components of the second motion vector 2204, and x and y components of the third motion vector 2206 as affine parameters.

According to an embodiment, the first motion vector 2202 may be determined to be an average of motion vectors of a plurality of adjacent blocks adjacent to the upper left coordinate 2201 of the current block 2200. Similarly, the second motion vector 2204 may be determined to be an average of motion vectors of a plurality of adjacent blocks adjacent to the upper right coordinate 2203 of the current block 2200. Also, the third motion vector 2206 may be determined to be an average of motion vectors of a plurality of adjacent blocks adjacent to the lower left coordinate 2205 or lower right coordinate 2207 of the current block 2200.

A motion vector 2210 of a sample 2208 of the current block 2200 may be determined according to the first motion vector 2202, the second motion vector 2204, and the third motion vector 2206, based on Equations 1 through 3.

In Equations 1 through 3, x denotes a horizontal distance difference between the upper left coordinate 2201 of the current block 2200 and the sample 2208 of the current block 2200, and y denotes a vertical distance difference between the upper left coordinate 2201 of the current block 2200 and the sample 2208 of the current block 2200. $MV_0$ denotes the first motion vector 2202, $MV_1$ denotes the second motion vector 2204, and $MV_2$ denotes the third motion vector 2206. MV denotes the motion vector 2210 of the sample 2208 of the current block 2200. w denotes the width of the current block 2200 and h denotes the height of the current block 2200. $dMV_x$ denotes a horizontal change rate of the motion vector 2210 and $dMV_y$ denotes a vertical change rate of the motion vector 2210.

$$dMV_x = \frac{(MV_1 - MV_0)}{w} \qquad \text{[Equation 1]}$$

$$dMV_y = \frac{(MV_2 - MV_0)}{h} \qquad \text{[Equation 2]}$$

$$MV = MV_0 + x.dMV_x + y.dMV_y \qquad \text{[Equation 3]}$$

Equation 1 represents a method of obtaining the horizontal change rate $dMV_x$ of the motion vector 2210. According to Equation 1, a value obtained by dividing a value, in which the first motion vector 2202 is subtracted from the second motion vector 2204, by the width of the current block 2200 is determined as the horizontal change rate of the motion vector 2210.

Equation 2 represents a method of obtaining the vertical change rate $dMV_y$ of the motion vector 2210. According to Equation 2, a value obtained by dividing a value, in which the first motion vector 2202 is subtracted from the third motion vector 2206, by the height of the current block 2200 is determined as the vertical change rate of the motion vector 2210.

Equation 3 represents a method of obtaining the motion vector 2210. According to Equation 3, the motion vector 2210 is determined to be a value obtained by adding inner product values of (x, y), which are coordinates of the sample 2208 of the current block 2200 with respect to the upper left coordinate 2201 of the current block 2200, and (dMV$_x$, dMV$_y$) indicating the vertical change rate and the horizontal change rate, to the first motion vector 2202 (MV$_0$).

According to Equations 1 through 3, motion vectors of all samples or subblocks included in the current block 2200 may be determined. According to Equations 1 through 3, motion vectors of samples may be determined differently based on locations of the samples. Equations 1 and 2 may be applied when vertical components of coordinates from which the first motion vector 2202 and the second motion vector 2204 are extracted are the same and horizontal components of coordinates from which the first motion vector 2202 and the third motion vector 2206 are extracted are the same. Accordingly, a generalized equation for determining a motion vector of the current block 2200 will be described below with reference to FIG. 28.

In the 6 parameter affine mode, the motion vector 2210 is determined by three motion vectors, and thus a reference block of the current block 2200 may be zoomed, rotated, and sheared from the current block 2200.

In the 4 parameter affine mode, the processor 1710 may obtain two motion vectors, i.e., the first and second motion vectors 2202 and 2204, from neighboring samples of the current block 2200. Like the 6 parameter affine mode, the first motion vector 2202 may be obtained from the neighboring samples of the upper left coordinate 2201 of the current block 2200. Similarly, the second motion vector 2204 may be obtained from the neighboring samples of the upper right coordinate 2203 of the current block 2200. Also, the processor 1710 may determine the x and y components of the first motion vector 2202 and the x and y components of the second motion vector 2204 as affine parameters.

In the 4 parameter affine mode, the third motion vector 2206 is not determined from the lower left coordinate 2205 or the lower right coordinate 2207 of the current block 2200, but is determined by combining the first motion vector 2202 and the second motion vector 2204.

Equations 4 and 5 represent a method of determining the third motion vector 2206 by combining the first motion vector 2202 and the second motion vector 2204. In Equations 4 and 5, x denotes a horizontal component of a motion vector and y denotes a vertical component of the motion vector. MV$_0$ denotes the first motion vector 2202, MV$_1$ denotes the second motion vector 2204, and MV$_2$ denotes the third motion vector 2206. w denotes the width of the current block 2200 and h denotes the height of the current block 2200.

$$MV_2[x]=(MV_1[y]-MV_0[y])*w/h+MV_0[x] \quad \text{[Equation 4]}$$

$$MV_2[y]=(MV_0[x]-MV_1[x])*w/h+MV_0[y] \quad \text{[Equation 5]}$$

According to Equation 4, a horizontal coordinate value (MV$_2$[x]) of the third motion vector 2206 is determined to be a value ((MV$_1$[y]−MV$_0$[y])*w/h+MV$_0$[x]) obtained by adding the horizontal coordinate value (MV$_0$[x]) of the first motion vector 2202 to a multiplication product of a value (MV$_1$[y]−MV$_0$[y]), in which the vertical coordinate value of the first motion vector 2202 is subtracted from the vertical coordinate value of the second motion vector 2204, and a value (w/h), in which the width of the current block 2200 is divided by the height of the current block 2200.

According to Equation 5, a vertical coordinate value (MV$_2$[y]) of the third motion vector 2206 is determined to be a value ((MV$_0$[x]−MV$_1$[x])*w/h+MV$_0$[y]) obtained by adding the vertical coordinate value (MV$_0$[y]) of the first motion vector 2202 to a multiplication product of a value (MV$_0$[x]−MV$_1$[x]), in which the horizontal coordinate value of the second motion vector 2204 is subtracted from the horizontal coordinate value of the first motion vector 2202, and a value (w/h), in which the width of the current block 2200 is divided by the height of the current block 2200.

In the 4 parameter affine mode, the x and y components of the third motion vector 2206 are induced from the first and second motion vectors 2202 and 2204. Accordingly, unlike the 6 parameter affine mode, in the 4 parameter affine mode, the reference block of the current block 2200 may be zoomed and rotated from the current block 2200 based on the first and second motion vectors 2202 and 2204. In other words, in the 4 parameter affine mode, the current block 2200 is not sheared.

In the 3 parameter affine mode, the processor 1710 may obtain two motion vectors, i.e., the first and second motion vectors 2202 and 2204, from the neighboring samples of the current block 2200. The first motion vector 2202 may be obtained from the neighboring samples of the upper left coordinate 2201 of the current block 2200. Similarly, the second motion vector 2204 may be obtained from the neighboring samples of the upper right coordinate 2203 of the current block 2200. However, unlike the 4 parameter affine mode, in the 3 parameter affine mode, only the x or y component is obtained from the second motion vector 2204. Thus, the processor 1710 may determine the x and y components of the first motion vector 2202 and the x or y component of the second motion vector 2204 as affine parameters.

When the x component of the second motion vector 2204 is obtainable, the y component of the second motion vector 2204 is obtained from the y component of the first motion vector 2202. On the other hand, when the y component of the second motion vector 2204 is obtainable, the x component of the second motion vector 2204 is obtained from the x and y components of the first motion vector 2202 and the y component of the second motion vector 2204. Equations 6 and 7 below respectively represent methods of determining the y and x components of the second motion vector 2204.

In Equations 6 and 7, x denotes a horizontal component of a motion vector and y denotes a vertical component of the motion vector. MV$_0$ denotes the first motion vector 2202, MV$_1$ denotes the second motion vector 2204, and MV$_2$ denotes the third motion vector 2206. w denotes the width of the current block 2200 and h denotes the height of the current block 2200.

$$MV_1[y]=MV_0[y] \quad \text{[Equation 6]}$$

$$MV_1[x]=\sqrt{w^2-(MV_1[y]-MV_0[y])^2}+MV_0[x]-w \quad \text{[Equation 7]}$$

According to Equation 6, when only the x component of the second motion vector 2204 is obtainable, the processor 1710 determines the y component of the second motion vector 2204 to be the same as the y component of the first motion vector 2202.

According to Equation 7, when only the y component of the second motion vector 2204 is obtainable, the processor 1710 determines the x component of the second motion vector 2204 according to the x and y components ($MV_0[x]$, $MV_0[y]$) of the first motion vector 2202 and the y component ($MV_1[y]$) of the second motion vector 2204.

Also, the x and y components of the third motion vector 2206 may be determined according to Equations 4 and 5 as in the 4 parameter affine mode. In the 3 parameter affine mode, a component not obtainable among the x and y components of the second motion vector 2204 is derived from, together with the third motion vector 2206, the first motion vector 2202 and an obtainable component among the x and y components of the second motion vector 2204. Thus, in the 3 parameter affine mode, the reference block of the current block 2200 may be only zoomed or rotated from the current block 2200 based on the first and second motion vectors 2202 and 2204. When the x component of the second motion vector 2204 is obtainable, the reference block of the current block 2200 may be only zoomed from the current block 2200. On the other hand, when the y component of the second motion vector 2204 is obtainable, the reference block of the current block may be only rotated from the current block 2200.

Figure 23:
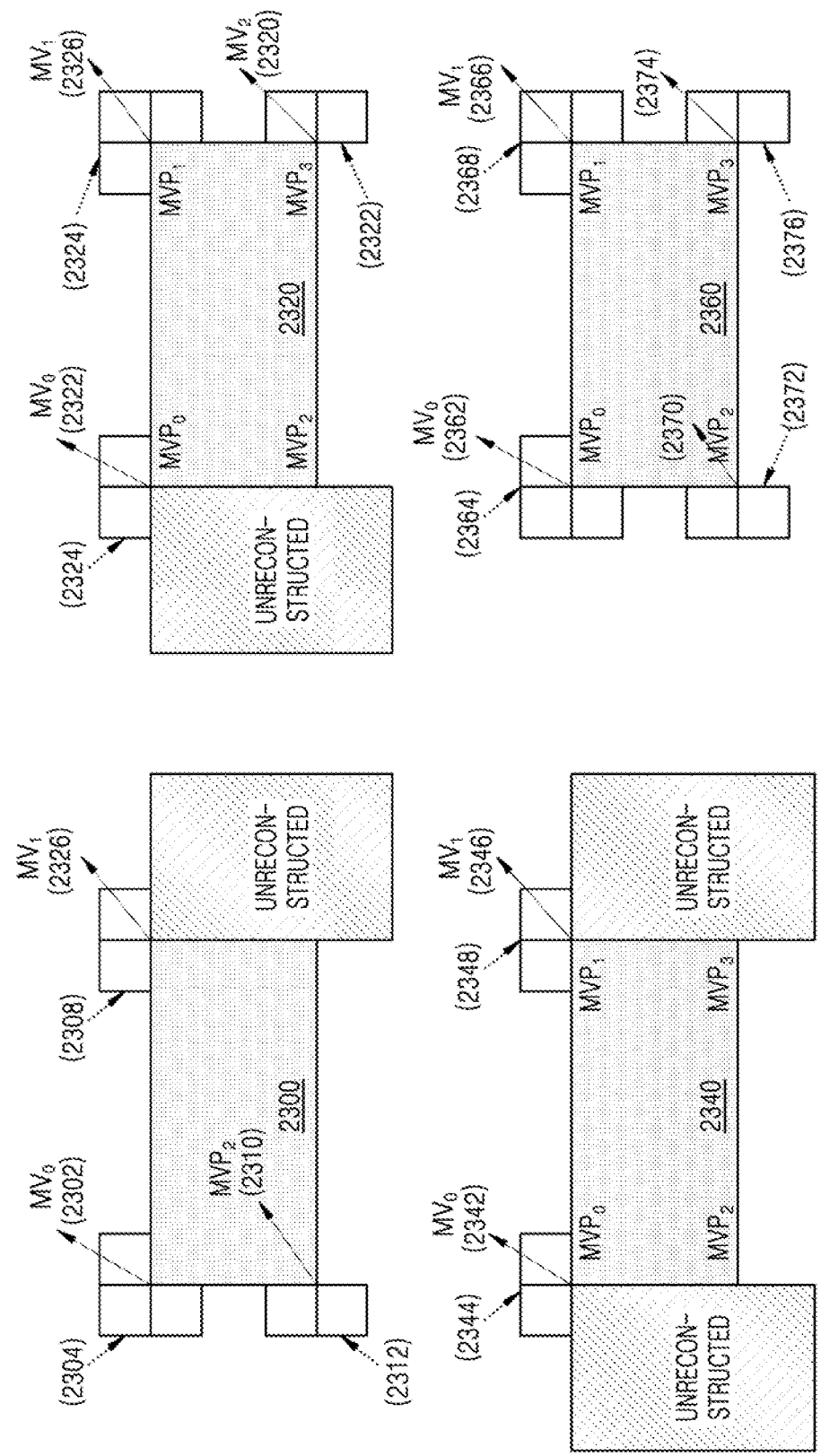
FIG. 23 is for describing an embodiment of determining an affine parameter group candidate from several sample locations of a current block.

FIG. 23 is for describing an embodiment of determining an affine parameter group candidate from several sample locations of a current block.

According to an embodiment of FIG. 23, three motion vectors are obtained from a current block in a 6 parameter affine mode. According to an embodiment, to obtain the three motion vectors, it is first determined whether left and right blocks of the current block are decoded. In FIG. 23, a method of determining an affine parameter when 1) only the left block of the current block is decoded, 2) only the right block of the current block is decoded, 3) both the left and right blocks of the current block are not decoded, and 4) both the left and right blocks of the current block are decoded will be sequentially described.

When only a left block of a current block 2300 is decoded, a first motion vector 2302 is obtained from adjacent samples 2304 at an upper left coordinate of the current block 2300. According to an embodiment, the first motion vector 2302 may be determined to be a motion vector of a block corresponding to one of the adjacent samples 2304. Also, the adjacent samples 2304 may be scanned according to a certain order, and when an inter-predicted adjacent block is discovered, scanning is stopped and the first motion vector 2302 is extracted from the inter-predicted adjacent block. Also, according to an embodiment, the first motion vector 2302 may be determined to be an average of motion vectors obtained from a plurality of blocks corresponding to the adjacent samples 2304.

Also, a second motion vector 2306 is obtained from adjacent samples 2308 at an upper right coordinate of the current block 2300. According to an embodiment, the second motion vector 2306 may be determined to be a motion vector of a block corresponding to one of the adjacent samples 2308. Also, the adjacent samples 2308 may also be scanned according to a certain order, and when an inter-predicted adjacent block is discovered, scanning is stopped and the second motion vector 2306 is extracted from the inter-predicted adjacent block. Also, according to an embodiment, the second motion vector 2306 may be determined to be an average of motion vectors obtained from a plurality of blocks corresponding to the adjacent samples 2308.

Also, a third motion vector 2310 is obtained from adjacent samples 2312 at a lower left coordinate of the current block 2300. According to an embodiment, the third motion vector 2310 may be determined to be a motion vector of a block corresponding to one of the adjacent samples 2312. Also, the adjacent samples 2312 may also be scanned according to a certain order, and when an inter-predicted adjacent block is discovered, scanning is stopped and the third motion vector 2310 is extracted from the inter-predicted adjacent block. Also, according to an embodiment, the third motion vector 2310 may be determined to be an average of motion vectors obtained from a plurality of blocks corresponding to the adjacent samples 2312.

Also, a horizontal change rate may be determined to be a value obtained by dividing a difference between the first and second motion vectors 2303 and 2306 by the width of the current block 2300. Also, a vertical change rate may be determined to be a value obtained by dividing a difference between the first and third motion vectors 2302 and 2310 by the height of the current block 2300.

When only a right block of a current block 2320 is decoded, a first motion vector 2322 is obtained from adjacent samples 2324 at an upper left coordinate of the current block 2320, like when only the left block of the current block 2300 is decoded. Also, a second motion vector 2326 is obtained from adjacent samples 2328 at an upper right coordinate of the current block 2320.

However, because the a block of the current block 2320 is not decoded, a third motion vector 2330 is obtained from adjacent samples 2332 at a lower right coordinate of the current block 2320. According to an embodiment, the third motion vector 2330 may be determined to be a motion vector of a block corresponding to one of the adjacent samples 2332. Also, according to an embodiment, the third motion vector 2330 may be determined to be an average of motion vectors obtained from a plurality of blocks corresponding to the adjacent samples 2332.

A horizontal change rate may be determined to be a value obtained by dividing a difference between the first and second motion vectors 2322 and 2326 by the width of the current block 2320. Also, a vertical change rate may be determined to be a value obtained by dividing a difference between the second and third motion vectors 2326 and 2330 by the height of the current block 2320.

When left and right blocks of a current block 2340 are both not decoded, a first motion vector 2342 is obtained from adjacent samples 2344 at an upper right coordinate of the current block 2340 like when only the left block of the current block 2300 is decoded. Also, a second motion vector 2346 is obtained from adjacent samples 2348 at an upper right coordinate of the current block 2340.

However, because the left and right blocks of the current block 2340 are both not decoded, a third motion vector is determined from the first motion vector 2342 and the second motion vector 2346. Accordingly, when the 6 parameter affine mode is applied to the current block 2340 and the left and right blocks of the current block 2340 are both not decoded, the current block 2340 is substantially decoded according to the 4 parameter affine mode.

When left and right blocks of a current block 2360 are both decoded, one of a method of determining a motion vector when only the left block of the current block 2300 is decoded and a method of determining a motion vector when only the right block of the current block 2320 is decoded may be selected. Thus, a first motion vector 2362 and a second motion vector 2366 may be determined respectively based on adjacent samples 2364 at an upper left coordinate of the current block 2360 and adjacent samples 2368 at an upper right coordinate of the current block 2360. Also, a third motion vector may be determined based on a lower left motion vector 2370 or a lower right motion vector 2374. The lower left motion vector 2370 is determined from adjacent samples 2372 at a lower left coordinate of the current block 2360 and the lower right motion vector 2374 is determined from adjacent samples 2376 at a lower left coordinate of the current block 2360.

A method of determining a motion vector may be determined from a higher level of the current block 2360. For example, the processor 1710 may determine a default motion vector determining method with respect to the higher level of the current block 2360. When the default motion vector determining method is a method of determining a motion vector when only the left block of the current block 2300 is decoded, a third motion vector may be determined according to the lower left motion vector 2370 of the current block 2300.

Alternatively, the processor 1710 may obtain motion vector information indicating one of the method of determining a motion vector when only the left block of the current block 2300 is decoded and a method of determining a motion vector when only the right block of the current block 2320 is decoded, for the current block 2360. Then, the method of determining a motion vector for the current block 2360 may be selected according to the motion vector information.

Figure 24:
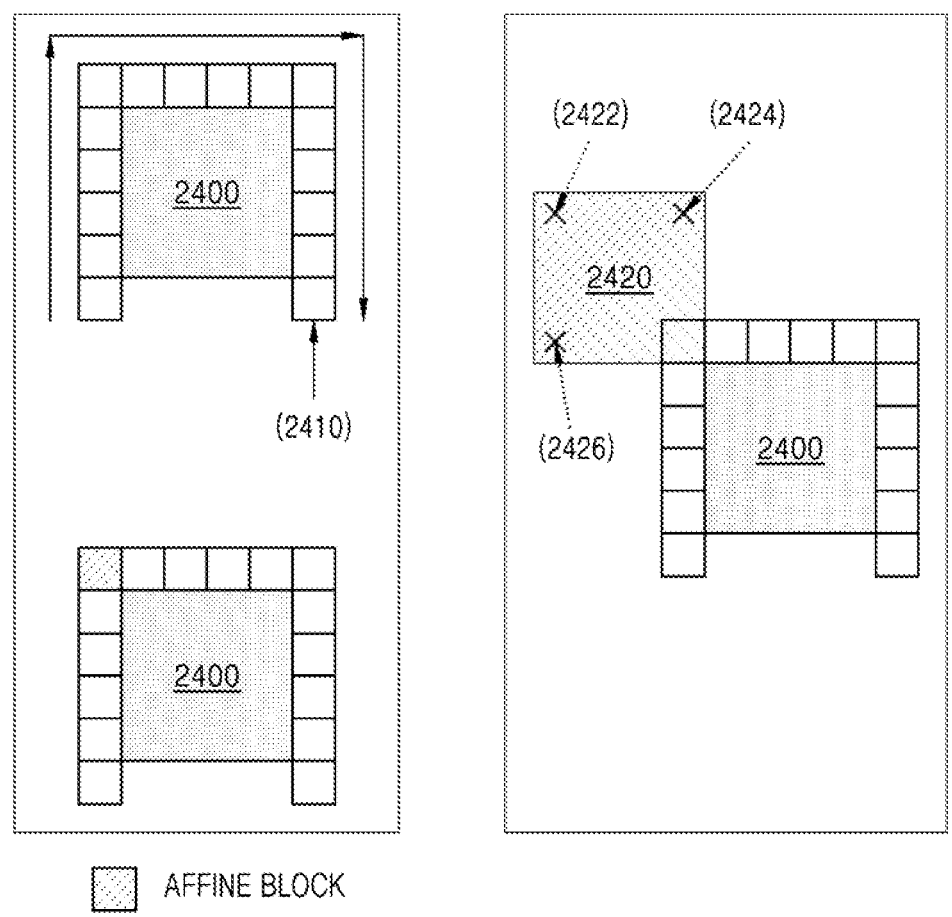
FIG. 24 is for describing an embodiment of determining an affine parameter group candidate from one adjacent block decoded according to an affine mode.

FIG. 24 is for describing an embodiment of determining an affine parameter group candidate from one adjacent block decoded according to an affine mode.

According to an embodiment, the processor 1710 may scan adjacent samples 2410 of a current block 2400. The processor 1710 may identify whether an adjacent block corresponding to the adjacent sample 2410 is decoded according to an affine mode. When an adjacent block 2420 decoded according to the affine mode is discovered, scanning of the adjacent samples 2410 is stopped, and a motion vector of the current block 2400 is induced from reference motion vectors obtained from reference motion vector locations, i.e., first through third reference motion vector locations 2422 through 2426, of the adjacent block 2420 decoded according to the affine mode.

In particular, a horizontal change rate is determined based on a difference between a first reference motion vector at the first reference motion vector location 2422 and a second reference motion vector at the second reference motion vector location 2424, and a horizontal distance between the first reference motion vector location 2422 and the second reference motion vector location 2424. Also, a vertical change rate is determined based on a difference between the first reference motion vector and a third reference motion vector at the third reference motion vector location 2426, and a vertical distance between the first reference motion vector location 2422 and the third reference motion vector location 2426.

Then, the motion vectors of the current block 2400 are induced based on the first reference motion vector, the horizontal change rate, the vertical change rate, and differences between the first reference motion vector location 2422, and an upper left location, upper right location, and a lower left location of the current block 2400.

An order of scanning the adjacent samples 2410 may be determined based on whether adjacent blocks of the current block 2420 are decoded. When a left block of the current block 2400 is decoded, the neighboring samples 2410 are scanned from a lower left adjacent sample to an upper left adjacent sample of the current block 2400 in an upward direction, from the upper left adjacent sample to an upper right adjacent sample of the current block 2400 in a right direction, and from the upper right adjacent sample to a lower right adjacent sample of the current block 2400 in a downward direction. On the other hand, when the left block of the current block 2400 is not decoded and a right block is decoded, the neighboring samples 2410 are scanned from the lower right adjacent sample to the upper right adjacent sample of the current block 2400 in an upward direction, from the upper right adjacent sample to the upper left adjacent sample of the current block 2400 in a left direction, and from the upper left adjacent sample to the lower left adjacent sample of the current block 2400 in a downward direction.

Also, when a prediction mode of the current block 2400 is an affine merge mode, the processor 1710 may obtain a reference picture index indicating a reference picture from the decoded adjacent block 2420.

Figure 25:
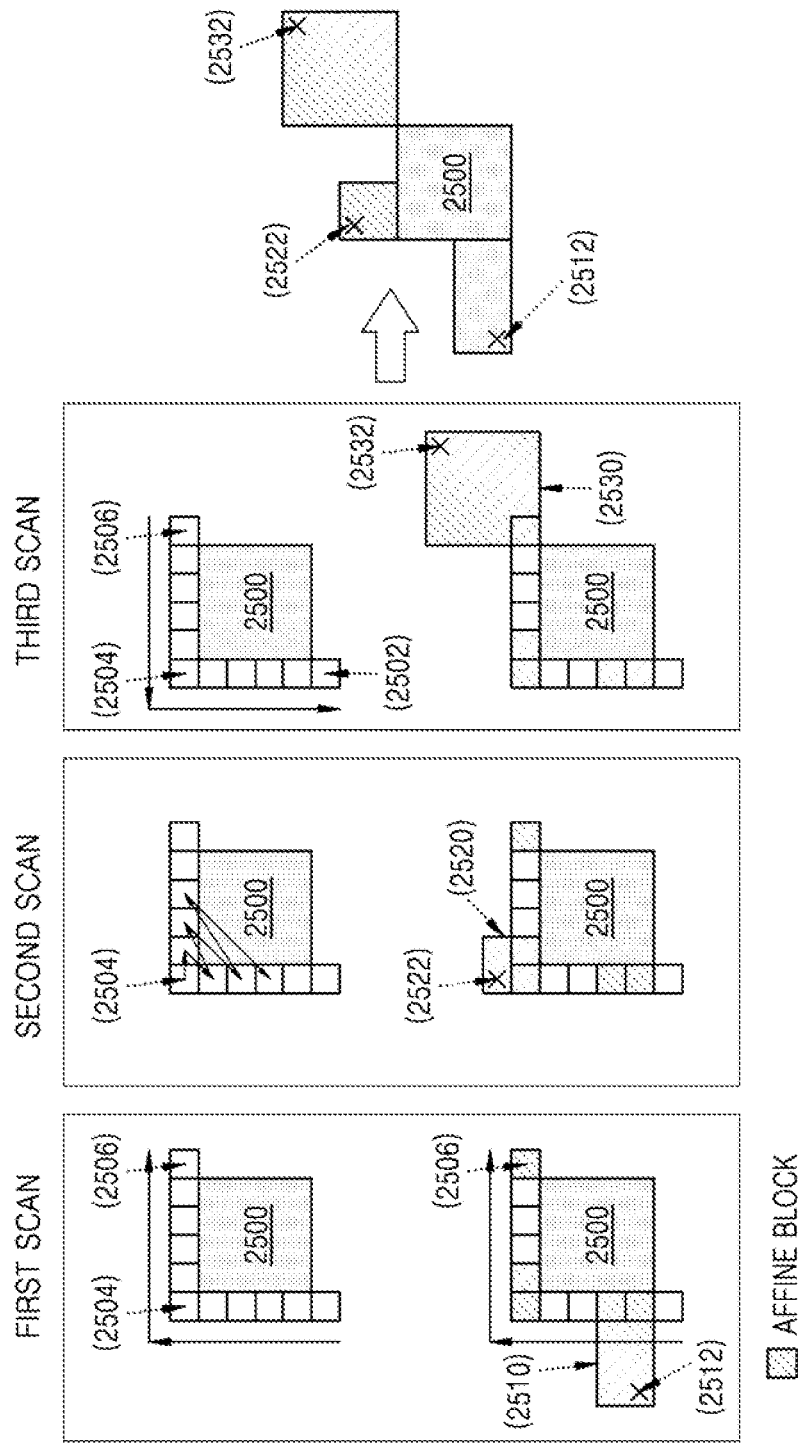
FIG. 25 is for describing an embodiment of determining an affine parameter group candidate from a plurality of adjacent blocks decoded according to an affine mode, when a left block of a current block is decoded and a right block is not decoded.

FIG. 25 is for describing an embodiment of determining an affine parameter group candidate from a plurality of adjacent blocks decoded according to an affine mode, when a left block of a current block 2500 is decoded and a right block is not decoded.

According to an embodiment, the processor 1710 may scan adjacent samples of a current block 2500 according to three types of scan orders. First, the processor 1710 may scan in an upward direction from a lower left adjacent sample 2502 to an upper left adjacent sample 2504 of the current block 2500. Also, the processor 1710 may scan in a right direction from the upper left adjacent sample 2504 to an upper right adjacent sample 2506 of the current block 2500. The processor 1710 may obtain a first motion vector from a lower left coordinate 2512 of a block 2510 decoded in an affine mode and first discovered during a first scan process.

Second, the processor 1710 may scan upper coordinates and left coordinates of the current block 2500 in zigzags from the upper left adjacent sample 2504 of the current block 2500 in an order close to the upper left adjacent sample 2504. Then, the processor 1710 may obtain a second motion vector from an upper left coordinate 2522 of a block 2520 decoded in an affine mode and first discovered during a second scan process.

Third, the processor 1710 may scan in a left direction from the upper right adjacent sample 2506 to the upper left adjacent sample 2504 of the current block 2500. Then, the processor 1710 may scan in a downward direction from the upper left adjacent sample 2504 to the lower left adjacent sample 2502 of the current block 2500. The processor 1710 may obtain a third motion vector from an upper right coordinate 2532 of a block 2530 decoded in an affine mode and discovered first during a third scan process.

The motion vector of the current block 2500 may be determined by extrapolating the obtained first through third motion vectors.

Figure 26:
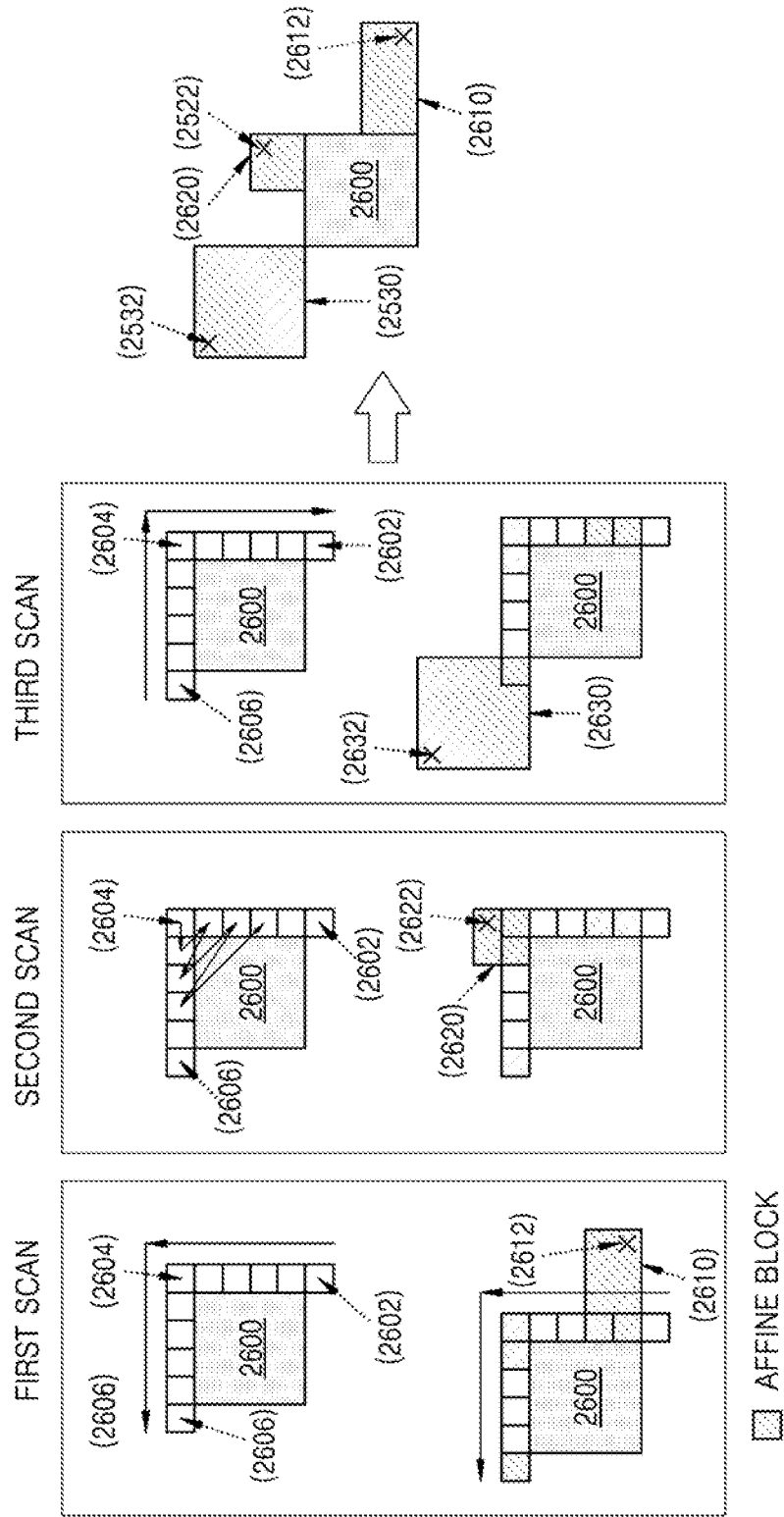
FIG. 26 is for describing an embodiment of determining motion vectors of a current block used in an affine mode from a plurality of adjacent blocks decoded according to the affine mode, when a right block of the current block is decoded and a left block is not decoded.

FIG. 26 is for describing an embodiment of determining motion vectors of a current block used in an affine mode from a plurality of adjacent blocks decoded according to the affine mode, when a right block of the current block is decoded and a left block is not decoded.

According to an embodiment, the processor 1710 may scan adjacent samples of a current block 2600 according to three types of scan orders. First, the processor 1710 may scan in an upward direction from a lower right adjacent sample 2602 to an upper right adjacent sample 2604 of the current block 2600. Also, the processor 1710 may scan in a left direction from the upper right adjacent sample 2604 to an upper left adjacent sample 2606 of the current block 2600. The processor 1710 may obtain a first motion vector from a lower right coordinate 2612 of a block 2610 decoded in an affine mode and first discovered during a first scan process.

Second, the processor 1710 may scan upper coordinates and right coordinates of the current block 2600 in zigzags from the upper right adjacent sample 2604 of the current block 2600 in an order close to the upper right adjacent sample 2604. Then, the processor 1710 may obtain a second motion vector from an upper right coordinate 2622 of a block 2620 decoded in an affine mode and first discovered during a second scan process.

Third, the processor 1710 may scan in a right direction from the upper left adjacent sample 2606 to the upper right adjacent sample 2604 of the current block 2600. Also, the processor 1710 may scan in a downward direction from the upper right adjacent sample 2604 to the lower right adjacent sample 2602 of the current block 2600. The processor 1710 may obtain a third motion vector from an upper left coordinate 2632 of a block 2630 decoded in an affine mode and discovered first during a third scan process.

The motion vector of the current block 2600 may be determined by extrapolating the obtained first through third motion vectors.

Figure 27:
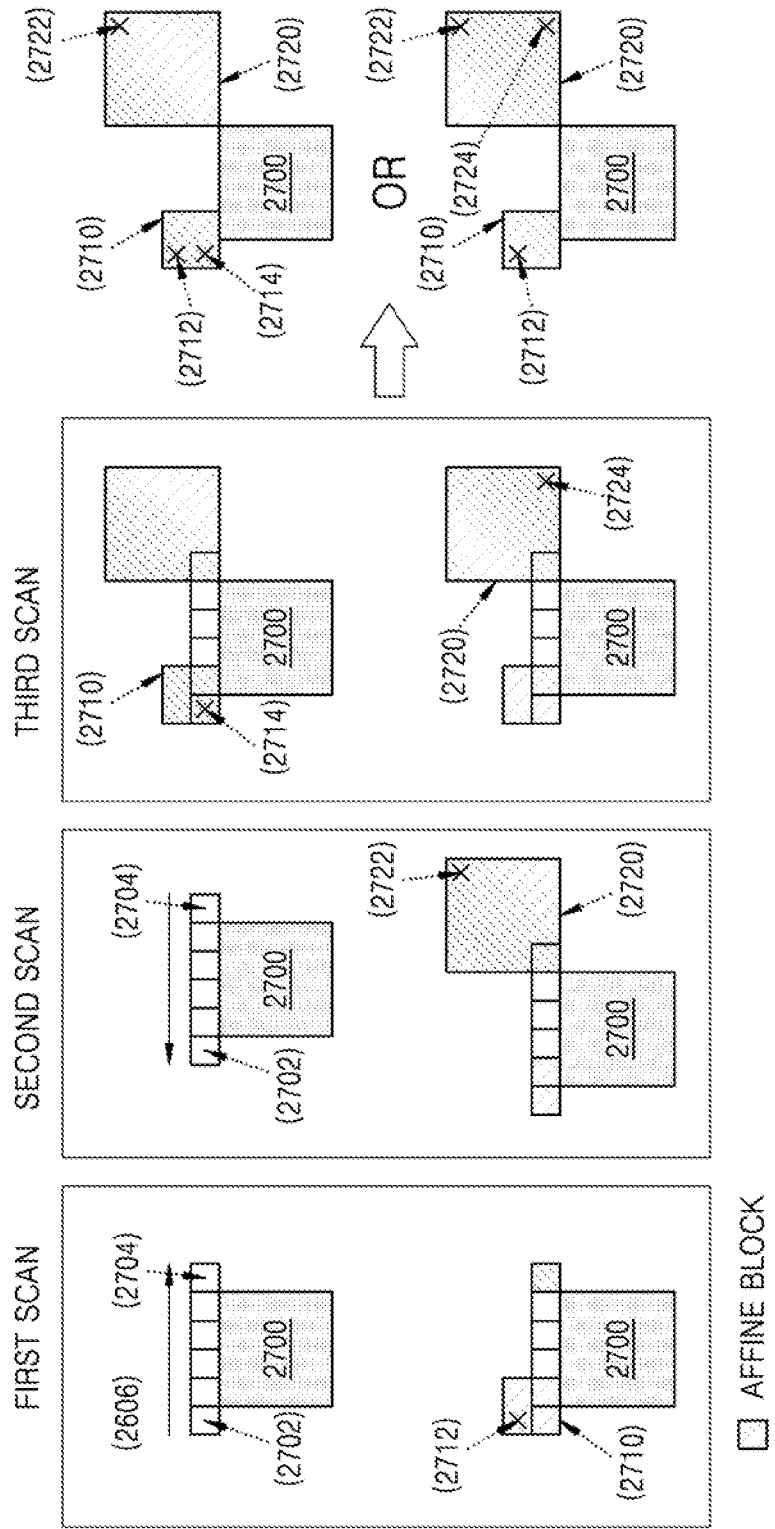
FIG. 27 is for describing an embodiment of determining motion vectors of a current block used in an affine mode from a plurality of adjacent blocks decoded according to the affine mode, when a right block and left block of the current block are not decoded.

FIG. 27 is for describing an embodiment of determining motion vectors of a current block used in an affine mode from a plurality of adjacent blocks decoded according to the affine mode, when a right block and left block of the current block are not decoded.

According to an embodiment, the processor 1710 may scan adjacent samples of a current block 2700 according to two types of scan orders.

Third, the processor 1710 may scan in a right direction from an upper left adjacent sample 2702 to an upper right adjacent sample 2704 of the current block 2700. The processor 1710 may obtain a first motion vector from an upper left coordinate 2712 of a block 2710 decoded in an affine mode and first discovered during a first scan process.

Second, the processor 1710 may scan in a left direction from the upper right adjacent sample 2704 to the upper left adjacent sample 2702 of the current block 2700. The processor 1710 may obtain a second motion vector from an upper right coordinate 2722 of a block 2720 decoded in an affine mode and first discovered during a second scan process.

Third, the processor 1710 may obtain a third motion vector from a lower left coordinate 2714 of the block 2710 of the first scan process. According to another embodiment, the processor 1710 may obtain the third motion vector from a lower right coordinate 2724 of the block 2720 of the second scan process.

A method of determining a motion vector of a current block, based on the first through third motion vectors determined in FIGS. 25 through 27 will be described in detail with reference to FIG. 28.

When an affine type of a current block is a 4 parameter affine mode or a 3 parameter affine mode in FIGS. 23 through 27, generating of a third motion vector of an affine parameter group candidate may be omitted. Also, when the affine type of the current block is the 3 parameter affine mode, generating of an x or y component of a second motion vector of an affine parameter group candidate may be omitted. When the affine type of the current block is the 4 parameter affine mode or the 3 parameter affine mode, decoding of a left and right blocks of the current block is not determined, and an affine parameter group candidate of the current block may be generated based only on upper, upper left, and upper right adjacent samples of the current block.

Various affine parameter group candidates described with reference to FIGS. 23 through 27 may be used in an affine merge mode or an affine inter mode. Also, a method of determining an affine parameter group candidate may be different in the affine merge mode and the affine inter mode.

Figure 28:
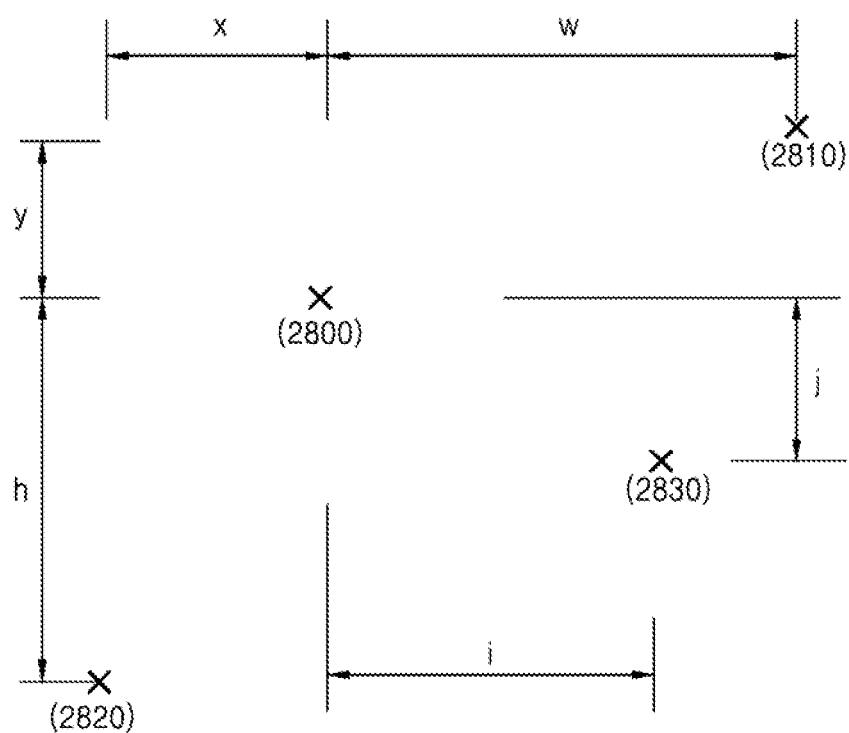
FIG. 28 is for describing a method of determining a motion vector determining method of a current block in an affine mode.

FIG. 28 is for describing a method of determining a motion vector determining method of a current block in an affine mode. Equations 8 through 10 below represent methods of determining a motion vector of a current block according to motion vector extraction locations, i.e., first through third motion vector extraction locations 2800, 2810, and 2820, of FIG. 28.

In Equations 8 and 9, w denotes the first motion vector extraction location 2800 and the second motion vector extraction location 2810. Also, h denotes a vertical distance between the first motion vector extraction location 2800 and the third motion vector extraction location 2820. Also, x denotes a horizontal distance between the first motion vector extraction location 2800 and the third motion vector extraction location 2820. Also, y denotes a vertical distance between the first motion vector extraction location 2800 and the second motion vector extraction location 2810.

$P_0$ denotes a first motion vector, $P_1$ denotes a second motion vector, and $P_2$ denotes a third motion vector. Then, dx and dy respectively denote a horizontal change rate and a vertical change rate.

$$dx = \frac{(hP_1 - yP_2) - (hP_0 - yP_0)}{wh - xy} \quad \text{[Equation 8]}$$

$$dy = \frac{(xP_1 - wP_2) - (xP_0 - wP_0)}{xy - wh} \quad \text{[Equation 9]}$$

The horizontal change rate is determined according to Equation 8 and the vertical change rate is determined according to Equation 9. Then, a motion vector of a sample 2830 of a current block is determined according to the horizontal change rate and the vertical change rate, according to Equation 10. In Equation 10, $P_a$ denotes the motion vector of the sample 2830 of the current block. Also, i denotes a horizontal distance between the first motion vector extraction location 2800 and the sample 2830 of the current block, and j denotes a vertical distance between the first motion vector extraction location 2800 and the sample 2830 of the current block.

$$P_a = P_0 + idx + jdy \quad \text{[Equation 10]}$$

When three motion vectors and an extraction location of each motion vector are provided according to Equations 8 through 10, motion vectors of samples included in a current block may be determined. Accordingly, even when extraction locations of motion vectors are not aligned as in FIGS. 25 through 28, motion vectors of samples included in a current block may be determined.

Figure 29:
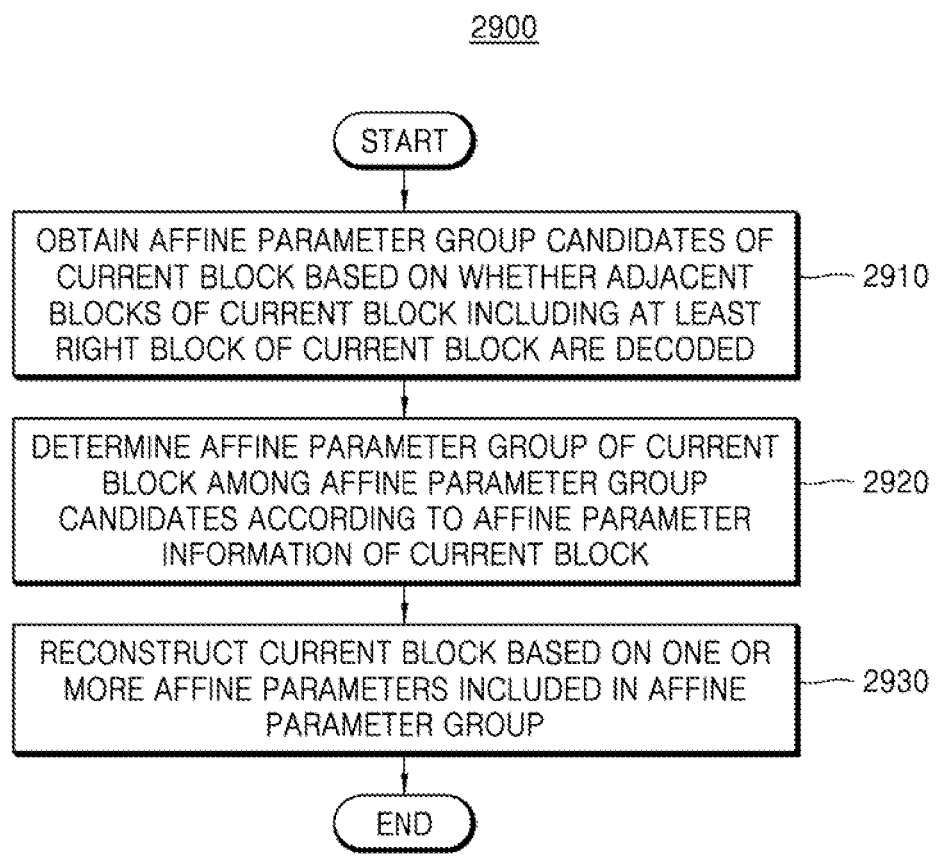
FIG. 29 illustrates a video decoding method according to an embodiment related to splitting of a current block and decoding of split lower blocks.

FIG. 29 illustrates a video decoding method 2900 according to an embodiment related to splitting of a current block and decoding of split lower blocks.

In operation 2910, affine parameter group candidates of a current block are obtained based on whether adjacent blocks of the current block including at least a right block of the current block are decoded.

According to an embodiment, to obtain the affine parameter group candidates, an adjacent block reconstructed in an affine mode may be scanned from among adjacent blocks of the current block, according to a scan order. Also, the affine parameter group candidate may be determined from the adjacent block reconstructed in the affine mode, the adjacent block being scanned first according to the scan order. The scan order information may be determined based on whether the adjacent blocks of the current block are decoded.

According to an embodiment, to obtain the affine parameter group candidates, an upper left coordinate of the current block may be determined as a first affine parameter extraction location and an upper right coordinate of the current block may be determined as a second affine parameter extraction location. A first motion vector may be obtained from at least one adjacent block adjacent to the first affine parameter extraction location, and a second motion vector may be obtained from at least one adjacent block adjacent to the second affine parameter extraction location.

A third motion vector may be obtained from the first motion vector and the second motion vector when both right and left blocks of the current block are not decoded. Also, the third motion vector may be obtained from a lower left coordinate of the current block when the left block of the current block is decoded and the right block of the current block is not decoded. Also, the third motion vector may be obtained from a lower right coordinate of the current block when the right block of the current block is decoded and the left block of the current block is not decoded.

Also, the affine parameter group candidate may be obtained according to the obtained first through third motion vectors.

When the right and left blocks of the current block are both decoded, the third motion vector is obtained from the lower left coordinate of the current block and a fourth motion vector is obtained from the lower right coordinate of the current block. Then, at least one of a first affine parameter group candidate obtained from the first through third motion vectors, a second affine parameter group candidate obtained from the first, second, and fourth motion vectors, and a third affine parameter group candidate determined from the first and second affine parameter group candidates may be determined.

According to an embodiment, to obtain the affine parameter group candidates, the first motion vector and a first motion vector extraction location may be determined from a first adjacent block decoded in an affine mode, the first adjacent block being discovered first in a scan process of scanning the adjacent blocks of the current block according to a first scan order from an adjacent block adjacent to the upper left coordinate of the current block. The second motion vector and a second motion vector extraction location may be determined from a second adjacent block decoded in an affine mode, the second adjacent block being first discovered in a scan process of scanning the adjacent blocks of the current block according to a second scan order from an adjacent block adjacent to the upper right coordinate of the current block.

When the right and left blocks of the current block are both not decoded, the third motion vector and a third motion vector extraction location may be determined from the first or second adjacent block. When the left block of the current block is decoded and the right block of the current block is not decoded, the third motion vector and the third motion vector extraction location may be determined from a third adjacent block decoded in the affine mode, the third adjacent block being first discovered in a scan process of scanning the adjacent blocks of the current block according to a third scan order from an adjacent block adjacent to the lower left coordinate of the current block. When the right block of the current block is decoded and the left block of the current block is not decoded, the third motion vector and the third motion vector extraction location may be determined from a fourth adjacent block decoded in the affine mode, the fourth adjacent block being first discovered in a scan process of scanning the adjacent blocks of the current block according to a fourth scan order from an adjacent block adjacent to the lower right coordinate of the current block.

The affine parameter group candidate may be obtained according to the first through third motion vectors and the first through third motion vector extraction locations.

When the right and left blocks of the current block are both decoded, at least one of the first affine parameter group candidate obtained when the left block is decoded and the right block is not decoded, the second affine parameter group candidate obtained when the right block is decoded and the left block is not decoded, and the third affine parameter group candidate obtained from the first and second affine parameter group candidates may be obtained.

In operation 2920, an affine parameter group of the current block is determined among the affine parameter group candidates, according to affine parameter information of the current block.

According to an embodiment, affine parameter correction information of the current block may be obtained. Also, affine parameters included in the affine parameter group may be corrected according to the affine parameter correction information.

In operation 2930, the current block is reconstructed based on the one or more affine parameters included in the affine parameter group.

Functions of the video decoding apparatus 1700 described with reference to FIG. 17 may be included in the video decoding method 2900.

Figure 30:
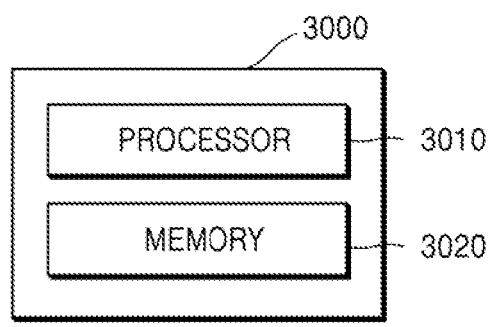
FIG. 30 illustrates a video encoding apparatus according to an embodiment related to splitting of a current block and encoding of split lower blocks.

FIG. 30 illustrates a video encoding apparatus 3000 according to an embodiment related to splitting of a current block and encoding of split lower blocks.

The video encoding apparatus 3000 includes a processor 3010 and a memory 3020. In FIG. 30, the processor 3010 and the memory 3020 are represented by component units located in one apparatus, but the processor 3010 and the memory 3020 need not necessarily be physically adjacent to each other. Thus, according to an embodiment, the processor 3010 and the memory 3020 may be distributed. In FIG. 30, the processor 3010 is represented as a single component, but according to an embodiment, a plurality of processors may be included in the video encoding apparatus 3000.

The processor 3010 may split a current block into two or more lower blocks, and determine whether to split the current block based on a result of splitting the current block. For example, when encoding efficiency is satisfactory when the current block is split, the processor 3010 may determine to split the current block, and when encoding efficiency is satisfactory when the current block is not split, the processor 3010 may determine not to split the current block.

The processor 3010 may generate split information indicating whether to split the current block. Then, the processor 3010 may determine a split method of the current block based on encoding efficiency, and generate split shape information indicating the split method of the current block.

The processor 3010 may determine an encoding order of the lower blocks included in the current block based on the encoding efficiency according to the encoding order, and generate encoding order information indicating the encoding order of the lower blocks. The processor 3010 may compare encoding efficiency when a current coding unit is encoded in a forward direction and encoding efficiency when the current coding unit is encoded in a reverse direction to determine the encoding order, thereby improving encoding efficiency of an image.

The processor 3010 may determine a prediction mode of the lower blocks of the current block when splitting of the current block is completed. The processor 3010 may determine the prediction mode of the lower block according to encoding efficiency of prediction modes applicable to the lower blocks. The prediction modes applicable to the lower blocks include an affine inter mode and an affine merge mode.

When the current block is not split, the processor 3010 may determine whether the affine inter mode or the affine merge mode is applied to the current block. Also, the processor 3010 may determine an affine parameter group candidate of the current block from an adjacent block of the current block, based on whether the adjacent block of the current block is encoded. Also, the processor 3010 may determine an optimum affine parameter group for predicting the current block, and determine affine inter information, affine merge information, affine parameter information, and affine type information of the current block.

The processor 3010 outputs a bitstream including information about encoding of the current block. Thus, the processor 3010 may output the bitstream including the affine inter information, the affine merge information, the affine parameter information, and the affine type information.

The video encoding apparatus 3000 of FIG. 30 may perform a video encoding method corresponding to a video decoding method performed by the video decoding apparatus 1700 of FIG. 17.

Figure 31:
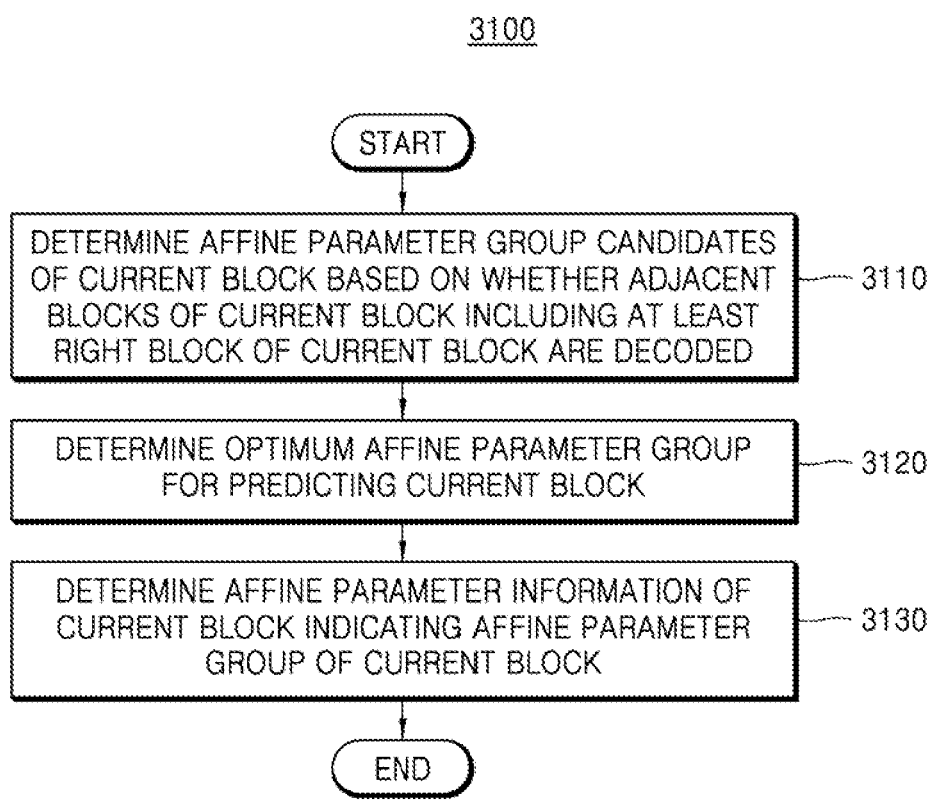
FIG. 31 illustrates a video encoding method according to an embodiment related to splitting of a current block and encoding of split lower blocks.

FIG. 31 illustrates a video encoding method 3100 according to an embodiment related to splitting of a current block and encoding of split lower blocks.

In operation 3110, affine parameter group candidates of a current block based on whether adjacent blocks of the current block including at least a right block of the current block are decoded.

In operation 3120, an optimum affine parameter group for predicting the current block may be determined.

In operation 3130, affine parameter information of the current block indicating an affine parameter group of the current block may be determined.

Functions of the video encoding apparatus 3000 described with reference to FIG. 30 may be included in the video encoding method 3100.

Image data in a spatial domain is encoded for each of coding units of a tree structure according to a video encoding technique based on the coding units of the tree structure described with reference to FIGS. 1 through 31, and the image data in the spatial domain is reconstructed when decoding is performed for each largest coding unit according to a video decoding technique based on the coding units of the tree structure, and thus a picture and a video that is a picture sequence may be reconstructed. The reconstructed video may be reproduced by a reproducing apparatus, stored in a storage medium, or transmitted via a network.

Meanwhile, the above-described embodiments of the disclosure may be written as a program executable on a computer, and may be implemented in a general-purpose digital computer operating a program using a computer-readable recording medium.

While the disclosure has been described in connection with specific embodiments thereof, other inventions in which substitutions, modifications, and variations are applied to the invention will be apparent to one of ordinary skill in the art in view of the above description. In other words, the claims are intended to cover all such substitutions, modifications and variations of the invention. Therefore, all content described in this specification and drawings should be interpreted in an illustrative and non-limiting sense.

The invention claimed is:

1. A non-transitory computer-readable storage medium storing a bitstream generated by a video encoding method, the bitstream comprising:
affine mode information for a current block indicating whether inter prediction of the current block is performed in an affine inter mode or an affine merge mode,
wherein:
affine parameter group candidates of the current block is determined based on whether adjacent blocks of the current block are decoded,
an affine parameter group is determined for predicting the current block,
affine parameter information of the current block is determined to indicate the affine parameter group of the current block,
the affine parameter group candidates include a first affine parameter group candidate, a second affine parameter group candidate and a third affine parameter group candidate,
the first affine parameter group candidate is determined based on a motion vector obtained from one or more adjacent blocks corresponding to a top-left point of the current block,
the second affine parameter group candidate is determined based on a motion vector obtained from one or more adjacent blocks corresponding to a top-right point of the current block,
the third affine parameter group candidate is determined based on a motion vector obtained from one or more adjacent blocks corresponding to a bottom-right point of the current block, and
the bitstream is output to include the affine mode information for the current block.

2. A video decoding method, comprising:
obtaining affine parameter group candidates of a current block based on whether adjacent blocks of the current block are decoded;
determining an affine parameter group of the current block from among the affine parameter group candidates, according to affine parameter information of the current block; and
reconstructing the current block, based on two or three affine parameters included in the affine parameter group,
wherein the affine parameter group candidates include a first affine parameter group candidate, a second affine parameter group candidate and a third affine parameter group candidate,
the first affine parameter group candidate is determined based on a motion vector obtained from one or more adjacent blocks corresponding to a top-left point of the current block,
the second affine parameter group candidate is determined based on a motion vector obtained from one or more adjacent blocks corresponding to a top-right point of the current block, and
the third affine parameter group candidate is determined based on a motion vector obtained from one or more adjacent blocks corresponding to a bottom-right point of the current block.

3. A video encoding method, comprising:
  determining affine parameter group candidates of a current block based on whether adjacent blocks of the current block are encoded;
  determining an affine parameter group for predicting the current block; and
  determining affine parameter information of the current block indicating the affine parameter group of the current block,
  wherein the affine parameter group candidates include a first affine parameter group candidate, a second affine parameter group candidate and a third affine parameter group candidate,
  the first affine parameter group candidate is determined based on a motion vector obtained from one or more adjacent blocks corresponding to a top-left point of the current block,
  the second affine parameter group candidate is determined based on a motion vector obtained from one or more adjacent blocks corresponding to a top-right point of the current block, and
  the third affine parameter group candidate is determined based on a motion vector obtained from one or more adjacent blocks corresponding to a bottom-right point of the current block.

* * * * *